United States Patent
Takano

(10) Patent No.: US 11,275,291 B2
(45) Date of Patent: Mar. 15, 2022

(54) COMMUNICATION DEVICE, METHOD OF CONTROLLING COMMUNICATION DEVICE, AND COMMUNICATION SYSTEM

(71) Applicant: Sony Group Corporation, Tokyo (JP)

(72) Inventor: Kengo Takano, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/632,669

(22) PCT Filed: Jul. 27, 2018

(86) PCT No.: PCT/JP2018/028320
§ 371 (c)(1),
(2) Date: Jan. 21, 2020

(87) PCT Pub. No.: WO2019/022243
PCT Pub. Date: Jan. 31, 2019

(65) Prior Publication Data
US 2021/0165302 A1 Jun. 3, 2021

(30) Foreign Application Priority Data
Jul. 28, 2017 (JP) .............................. JP2017-146773

(51) Int. Cl.
*G03B 15/05* (2021.01)
*H04N 5/235* (2006.01)
*H04N 5/225* (2006.01)

(52) U.S. Cl.
CPC .......... *G03B 15/05* (2013.01); *H04N 5/2256* (2013.01); *H04N 5/2354* (2013.01); *G03B 2215/0567* (2013.01)

(58) Field of Classification Search
CPC ............................................. G03B 2215/0557
See application file for complete search history.

(56) References Cited

U.S. PATENT DOCUMENTS 6,628,208 B1* 9/2003 Morozumi ............. G08C 17/02
340/870.11
8,160,435 B2* 4/2012 Okubo ................... G03B 15/05
396/56
(Continued)

FOREIGN PATENT DOCUMENTS

JP  200089308 A  3/2000
JP  2009-186702 A  8/2009
(Continued)

OTHER PUBLICATIONS

Chinese Office Action dated May 7, 2021 for corresponding Chinese Application No. 201880048819.1.
(Continued)

*Primary Examiner* — Clayton E. LaBalle
*Assistant Examiner* — Leon W Rhodes, Jr.
(74) *Attorney, Agent, or Firm* — Michael Best & Friedrich LLP

(57) ABSTRACT

Provided is a communication device including: a communication unit configured to perform communication with a plurality of external communication devices; and an allocation unit configured to allocate the plurality of external communication devices to one or a plurality of group frames on a basis of information regarding the plurality of external communication devices obtained through the communication unit.

18 Claims, 19 Drawing Sheets

(56) References Cited

U.S. PATENT DOCUMENTS

| | | | |
|---|---|---|---|
| 8,824,881 B2 * | 9/2014 | Li | G03B 15/05 396/155 |
| 10,548,256 B2 * | 2/2020 | Graham | A01B 79/005 |
| 2012/0287296 A1 * | 11/2012 | Fukui | G03B 31/00 348/211.2 |
| 2015/0208431 A1 | 7/2015 | Chen et al. | |
| 2017/0013699 A1 | 1/2017 | Midorikawa | |

FOREIGN PATENT DOCUMENTS

| | | | | |
|---|---|---|---|---|
| JP | 2013160788 A | * | 8/2013 | |
| JP | 2014006304 A | * | 1/2014 | |
| WO | 2014054125 A1 | | 4/2014 | |

OTHER PUBLICATIONS

Japanese Office Action dated Mar. 23, 2021 for corresponding Japanese Application No. 2017-146773.

* cited by examiner

[FIG. 1]
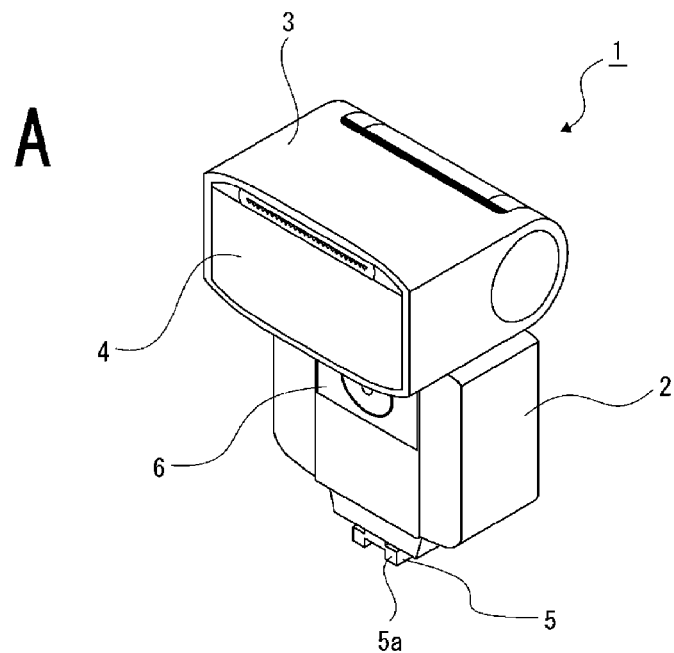
A
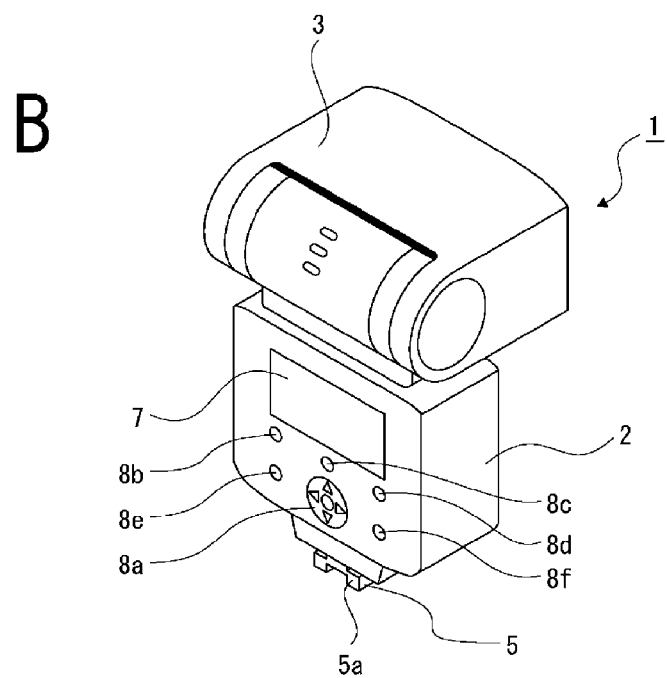
B

[FIG. 2]
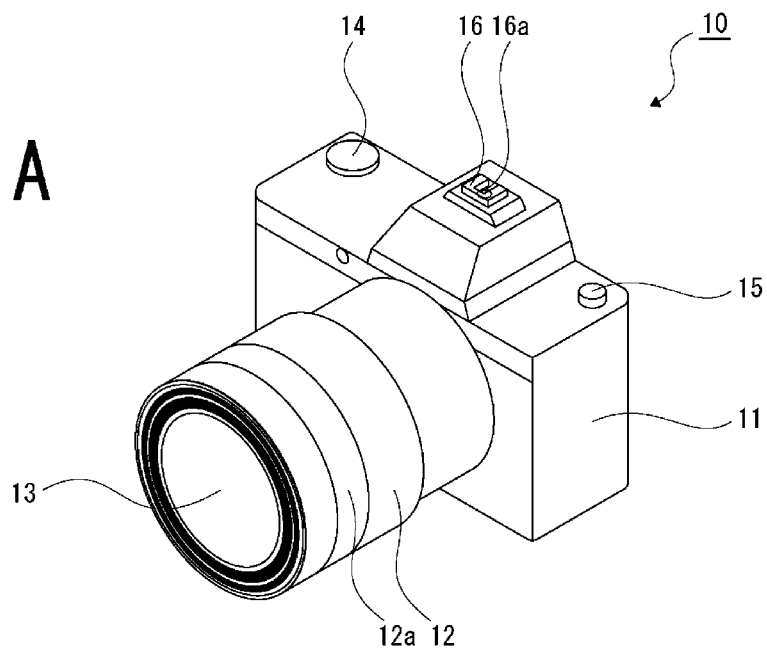
A
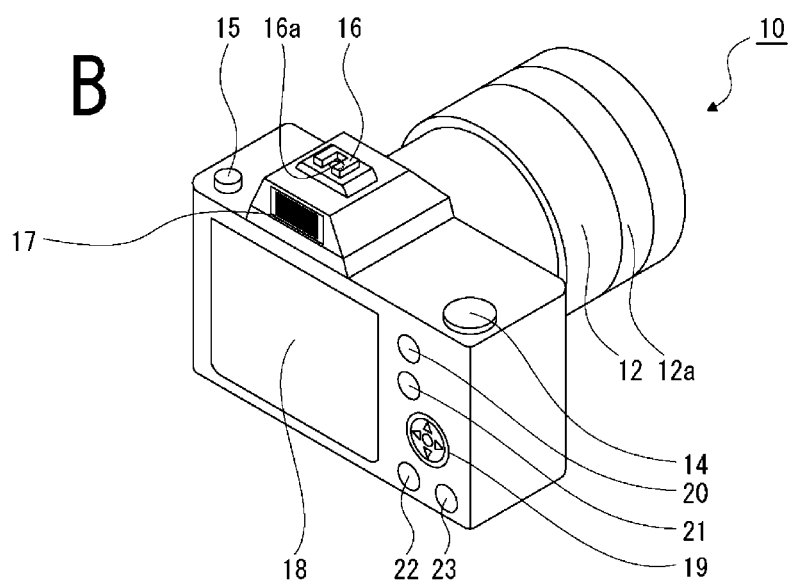
B

[FIG 3]
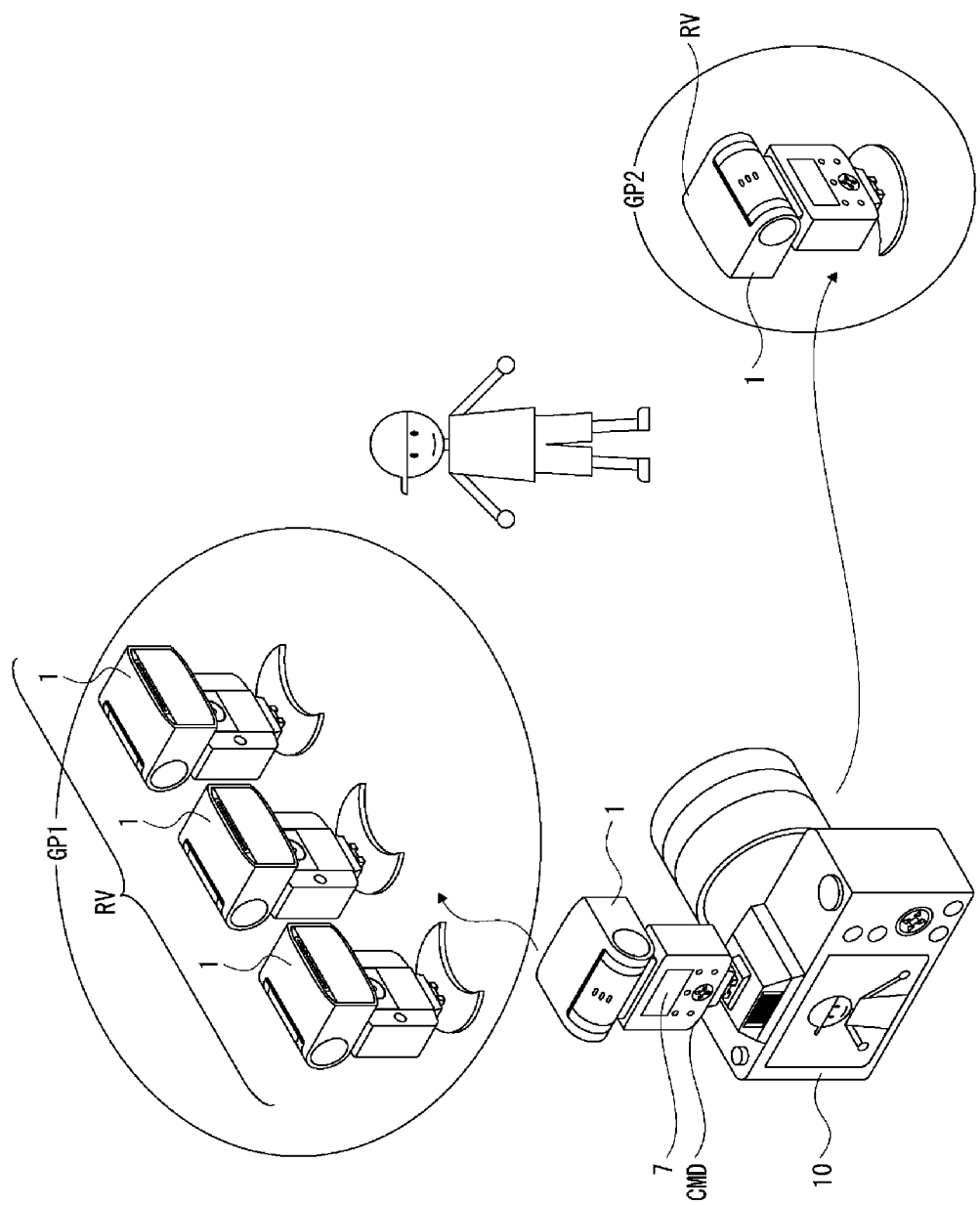

[FIG. 4]
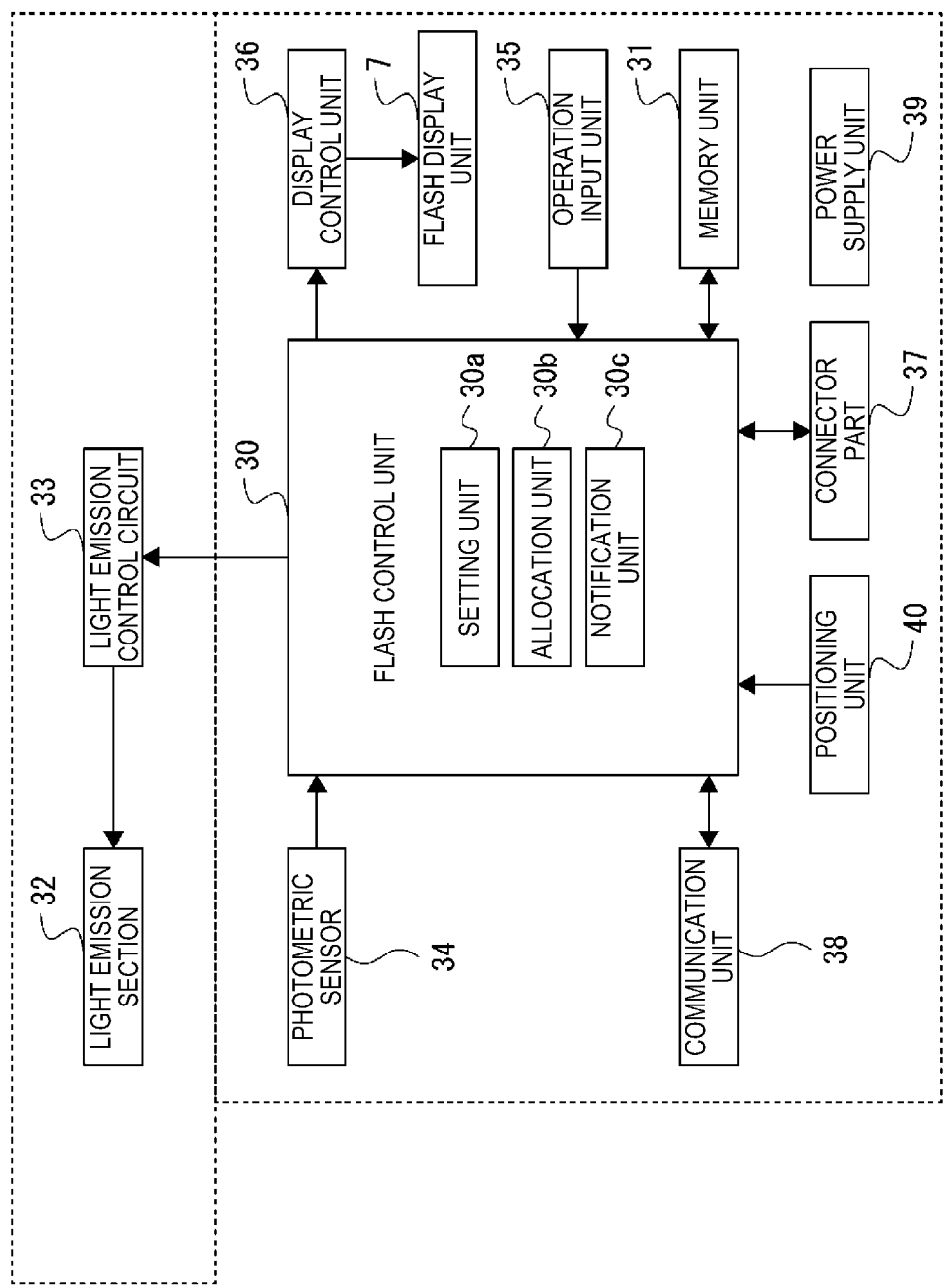

[FIG 5]
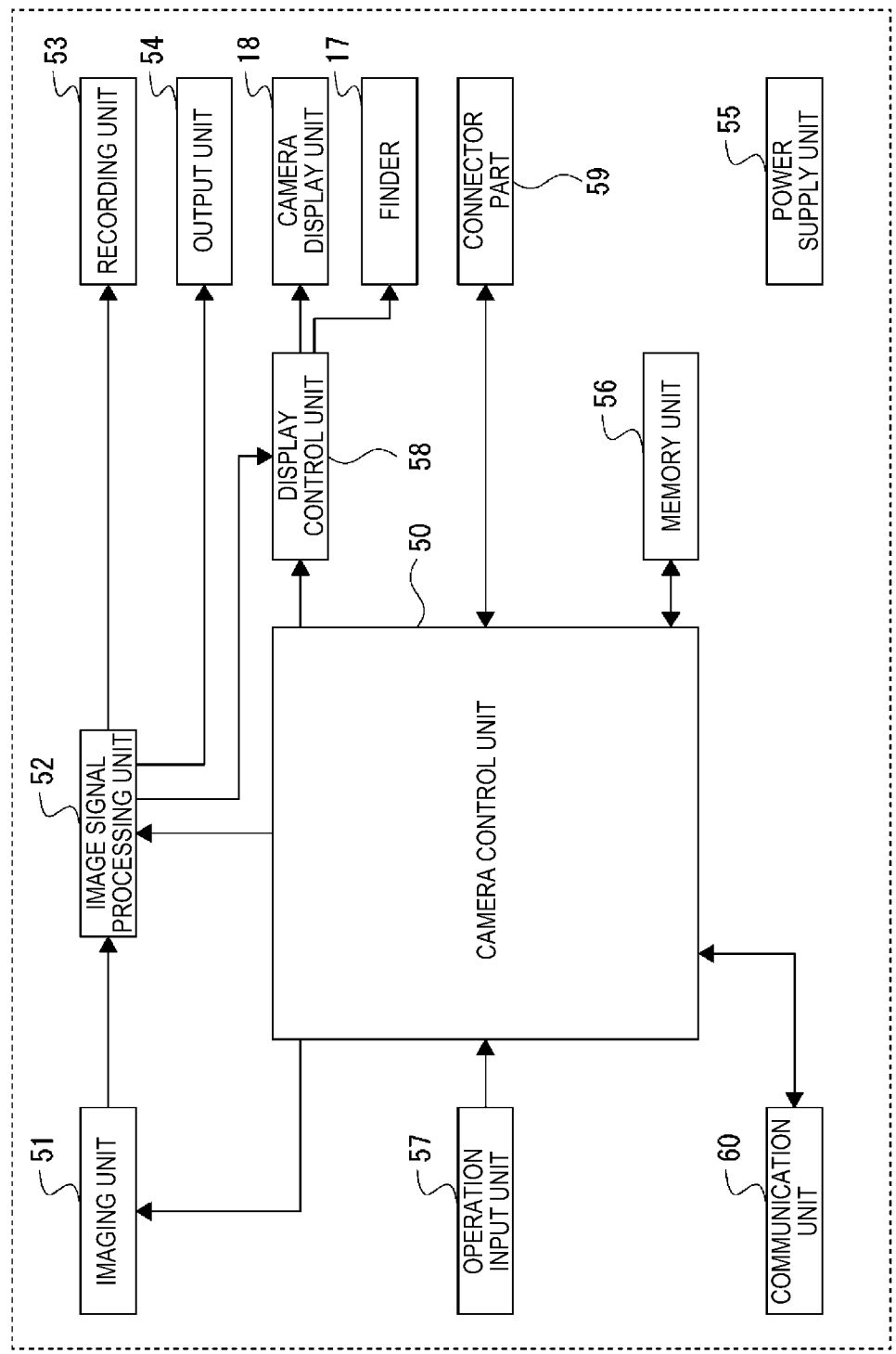

[FIG. 6]
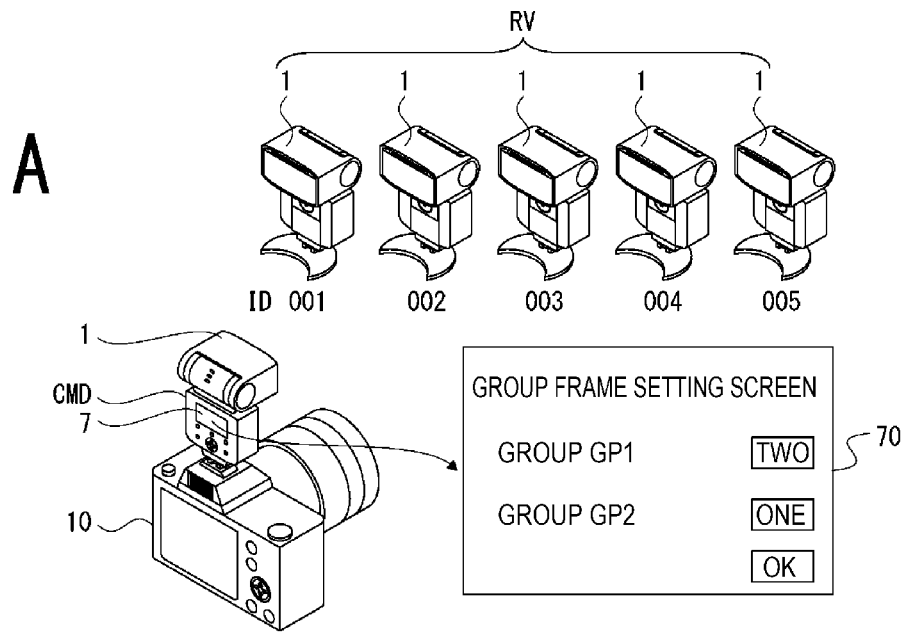
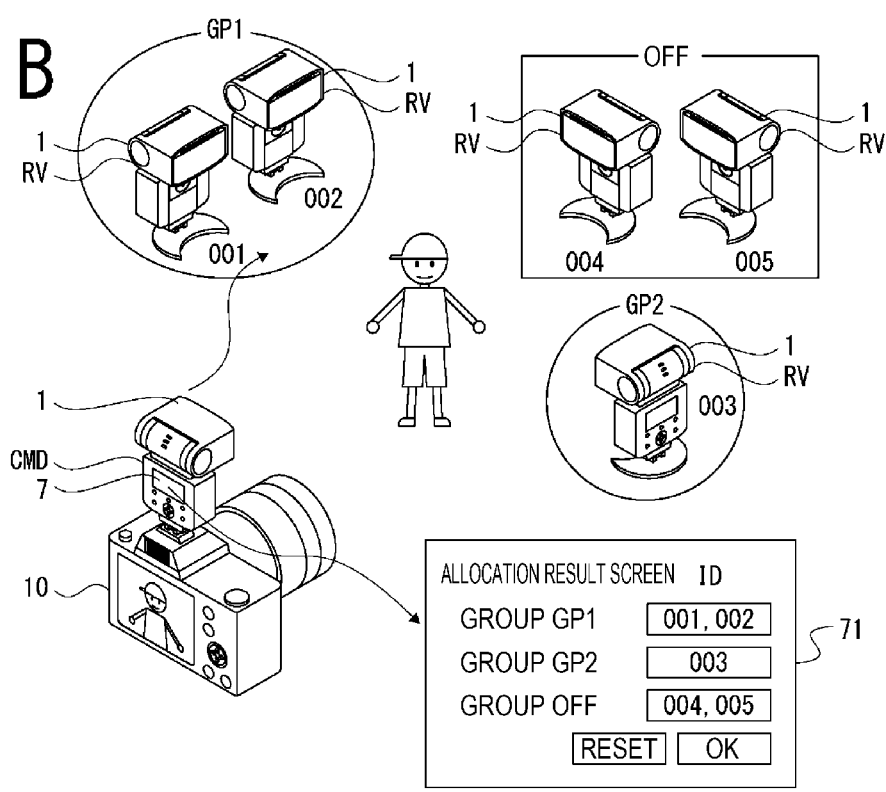

[FIG. 7]
A 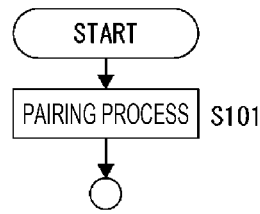
B 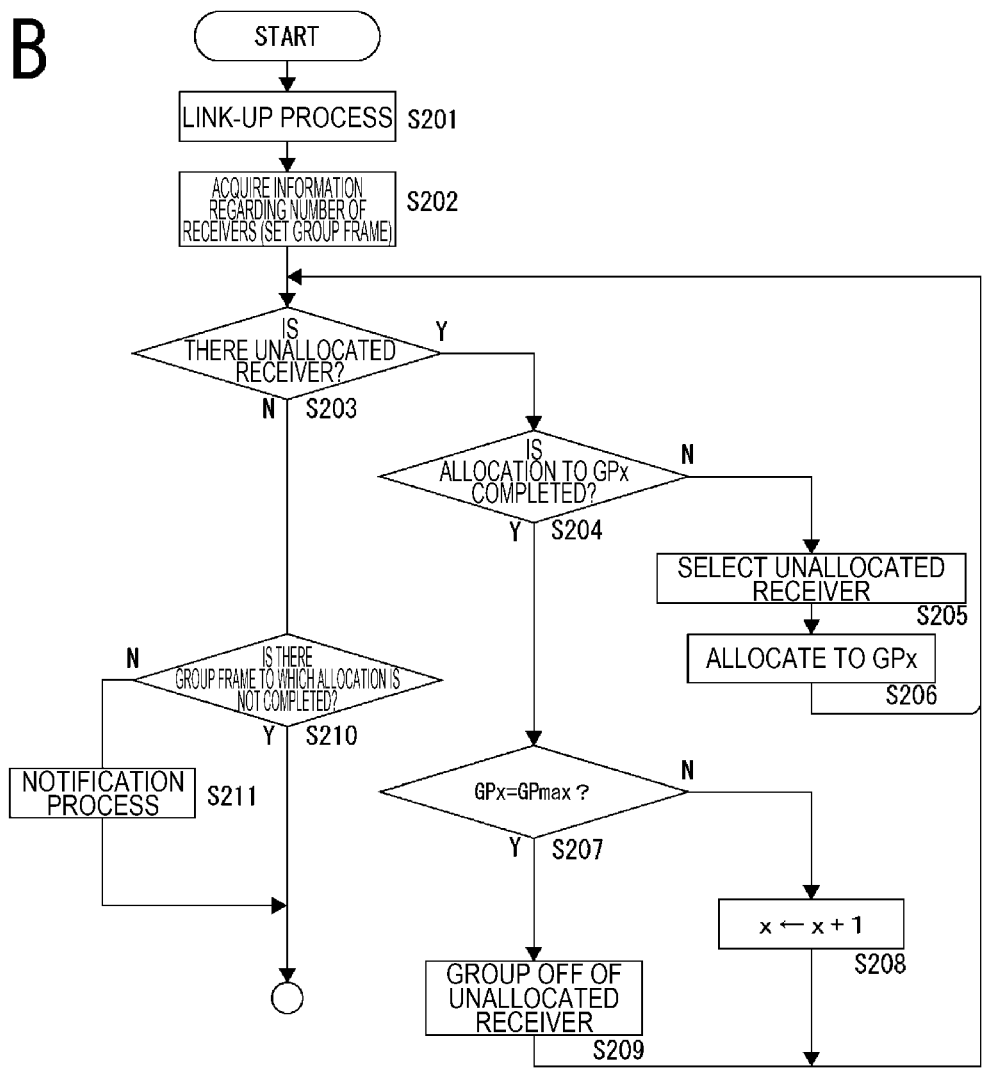

[FIG. 8]
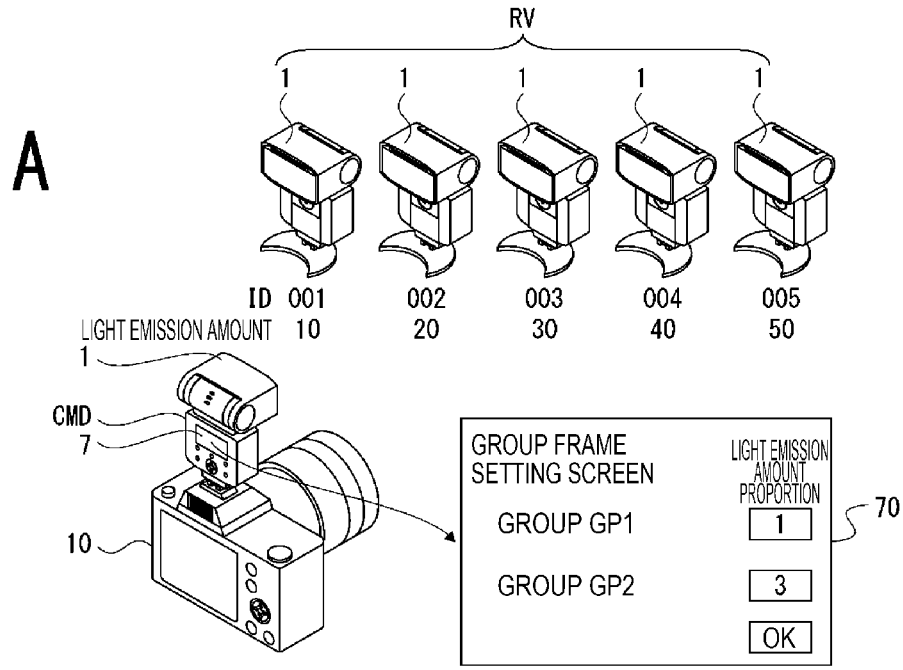
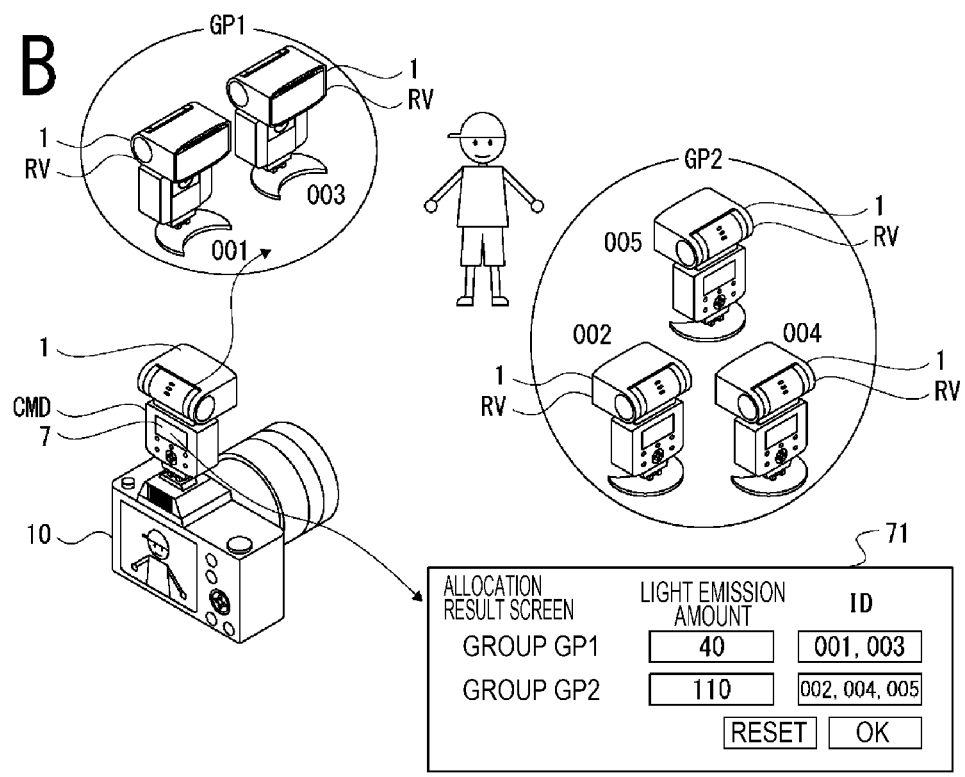

[FIG. 9]
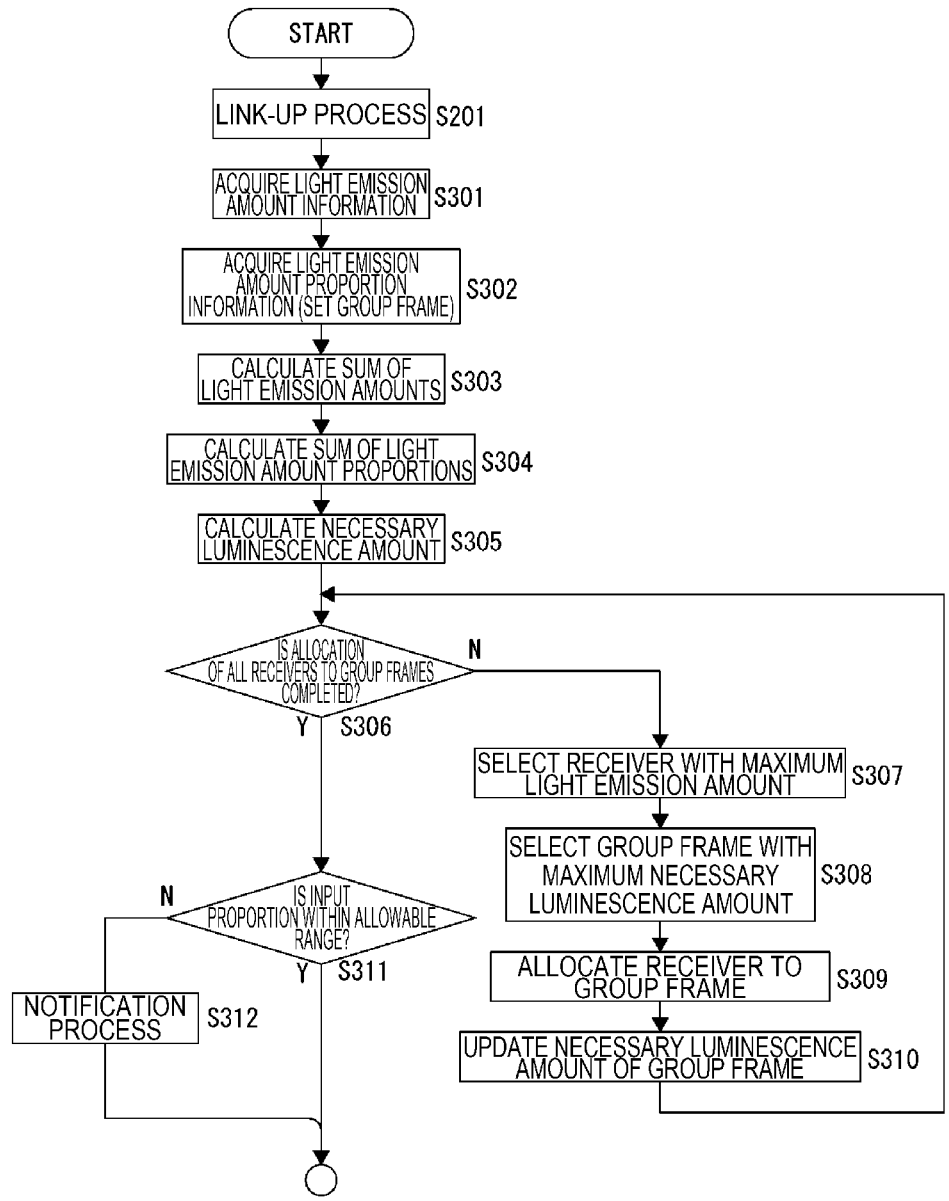

[FIG. 10]

| RECEIVER ID | MODEL INFORMATION | LIGHT EMISSION AMOUNT |
|---|---|---|
| 001 | AAA-001BB | 10 |
| 002 | ABB-002AB | 20 |
| 003 | ABC-010BC | 30 |
| 004 | BBB-011BB | 40 |
| 005 | CCC-012CC | 50 |

[FIG. 11]
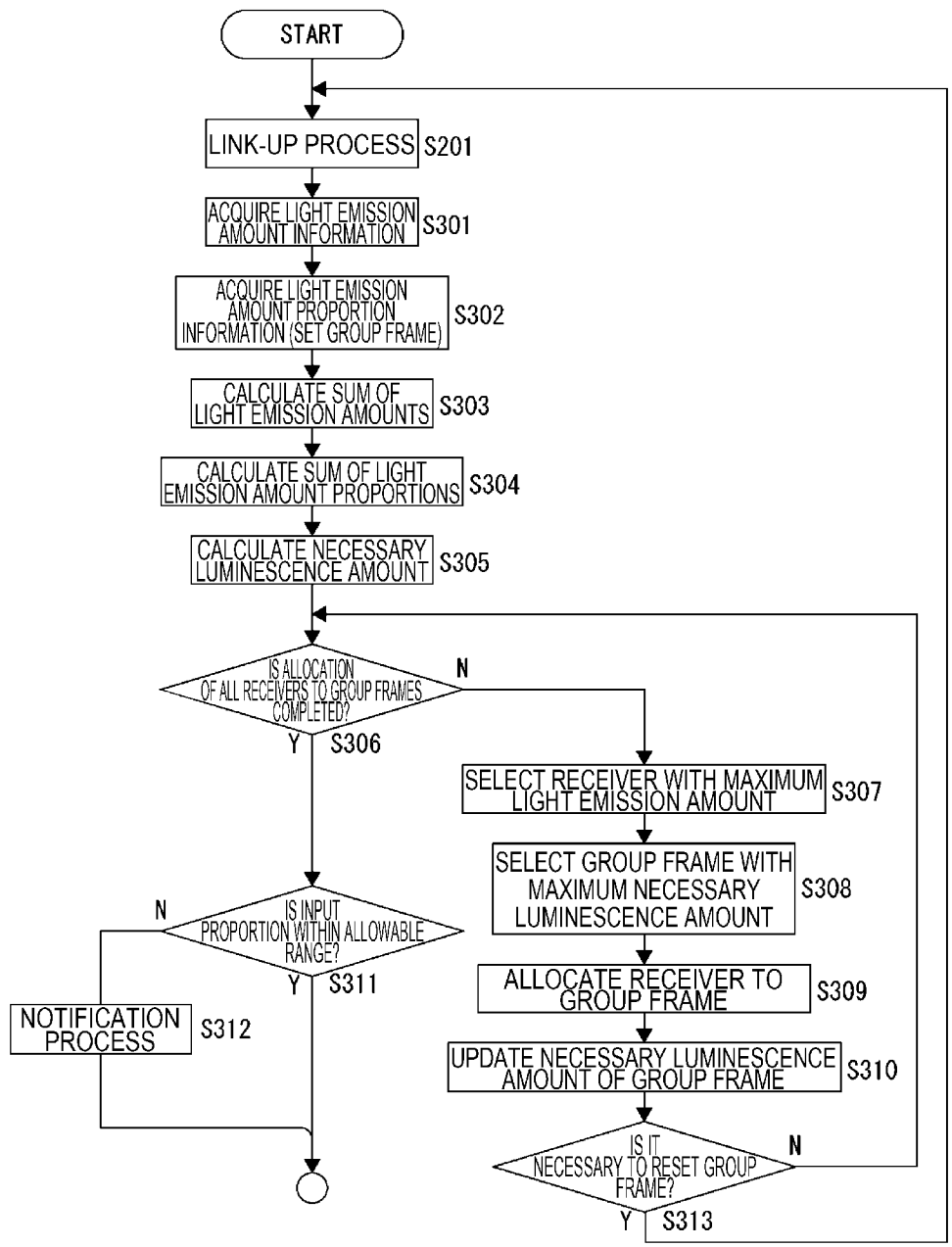

[FIG. 12]
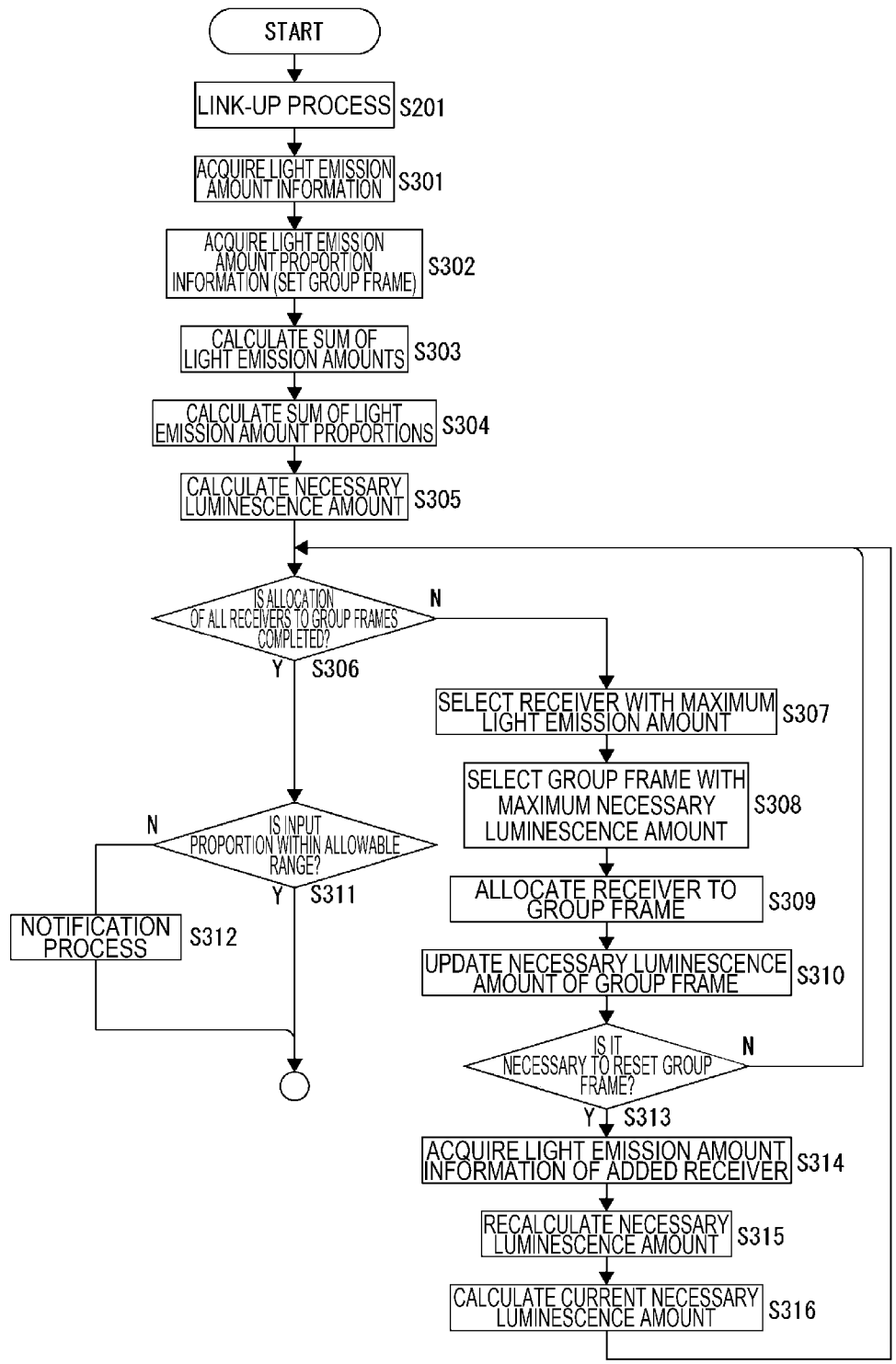

[FIG. 13]
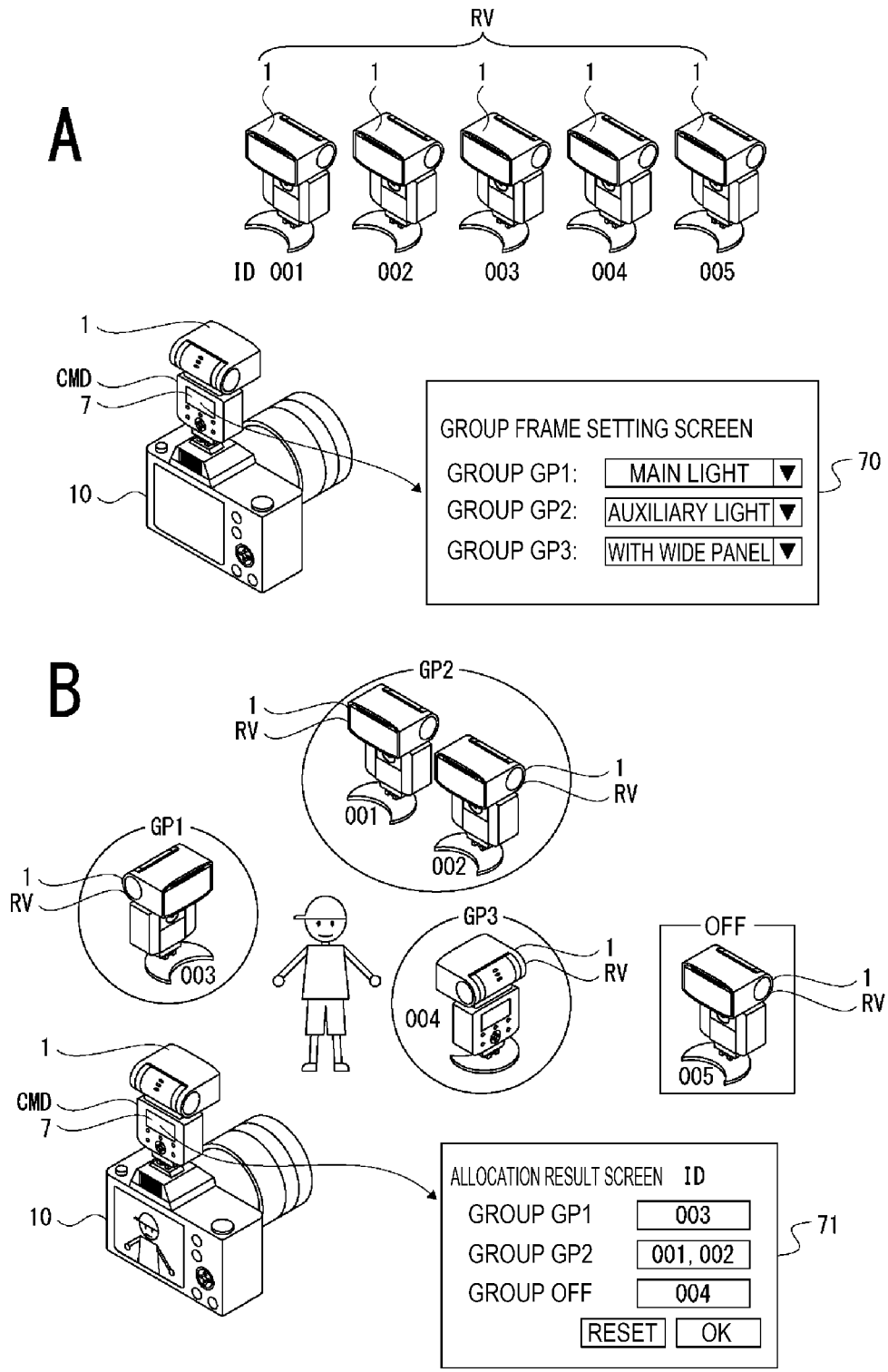

[FIG. 14]
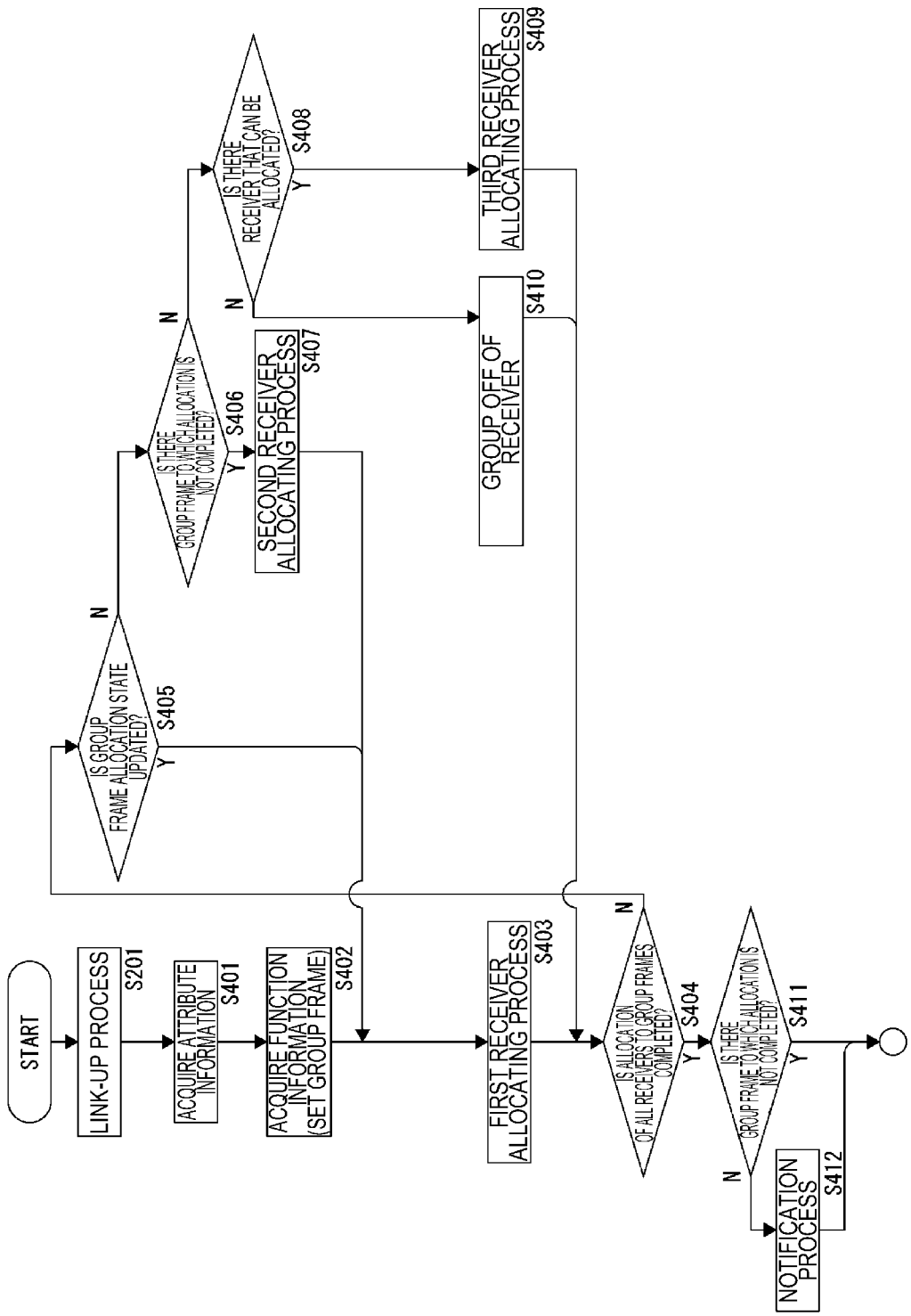

[FIG. 15]

| RECEIVER ID | MODEL INFORMATION | MAIN LIGHT | AUXILIARY LIGHT | WITH WIDE PANEL | REMOTE LENS | ... |
|---|---|---|---|---|---|---|
| 001 | AA-01AA | — | ○ | ○ | — | ... |
| 002 | BB-02BB | — | ○ | — | — | ... |
| 003 | CC-03CC | ○ | — | ○ | — | ... |
| 004 | DD-04DD | — | ○ | ○ | — | ... |
| 005 | EE-05EE | — | — | — | ○ | ... |

[FIG. 16]
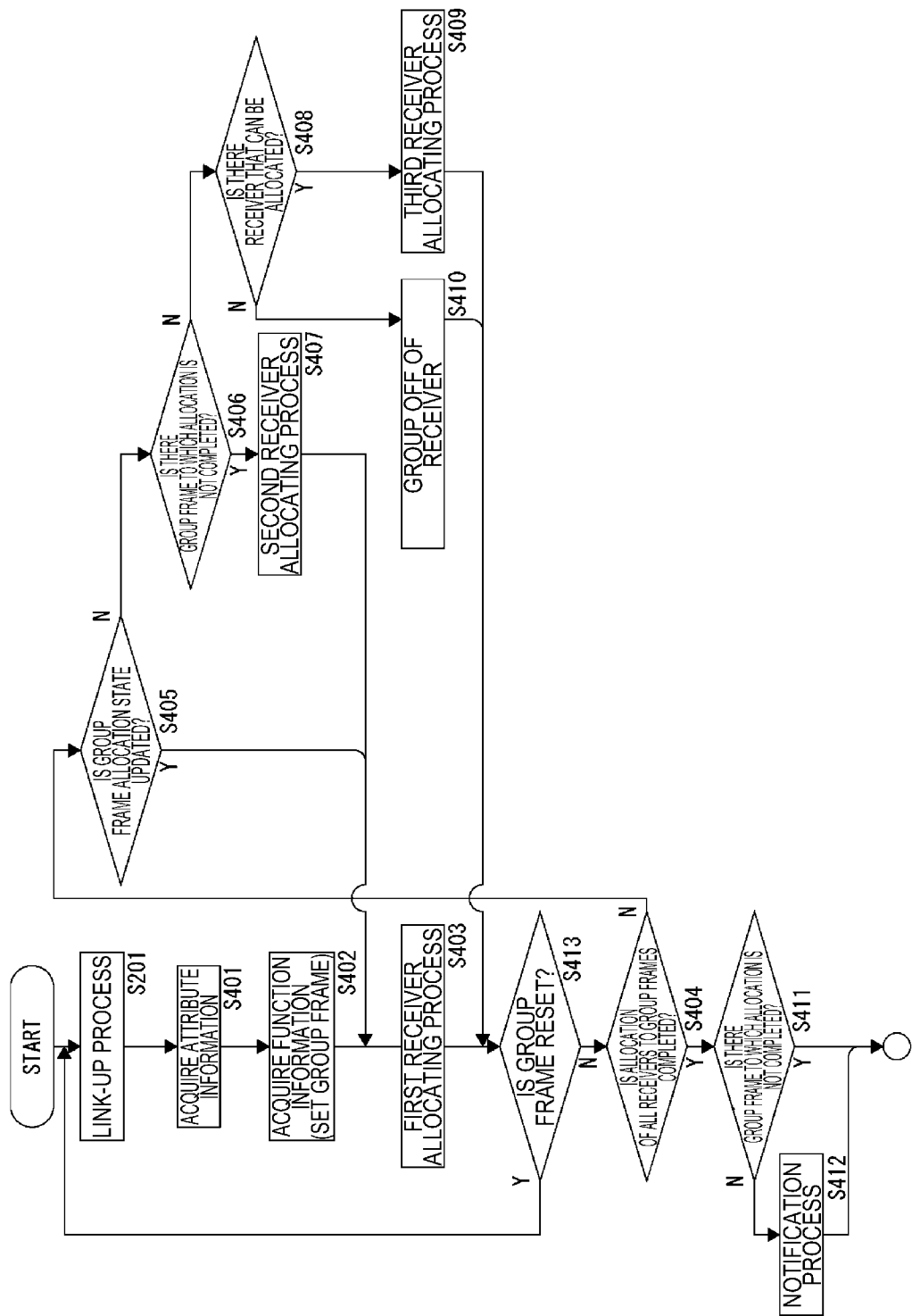

[FIG. 17]
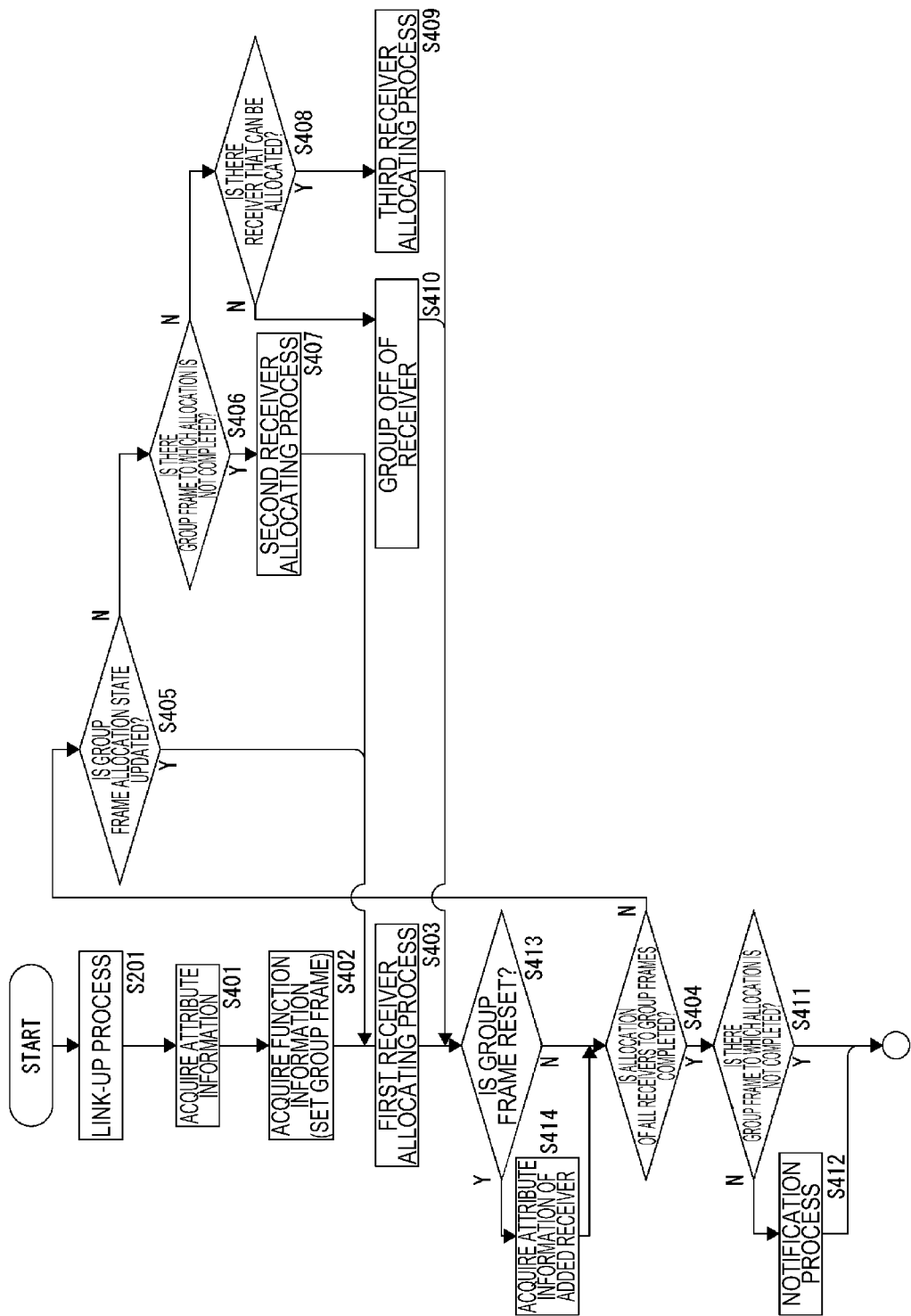

[FIG. 18]
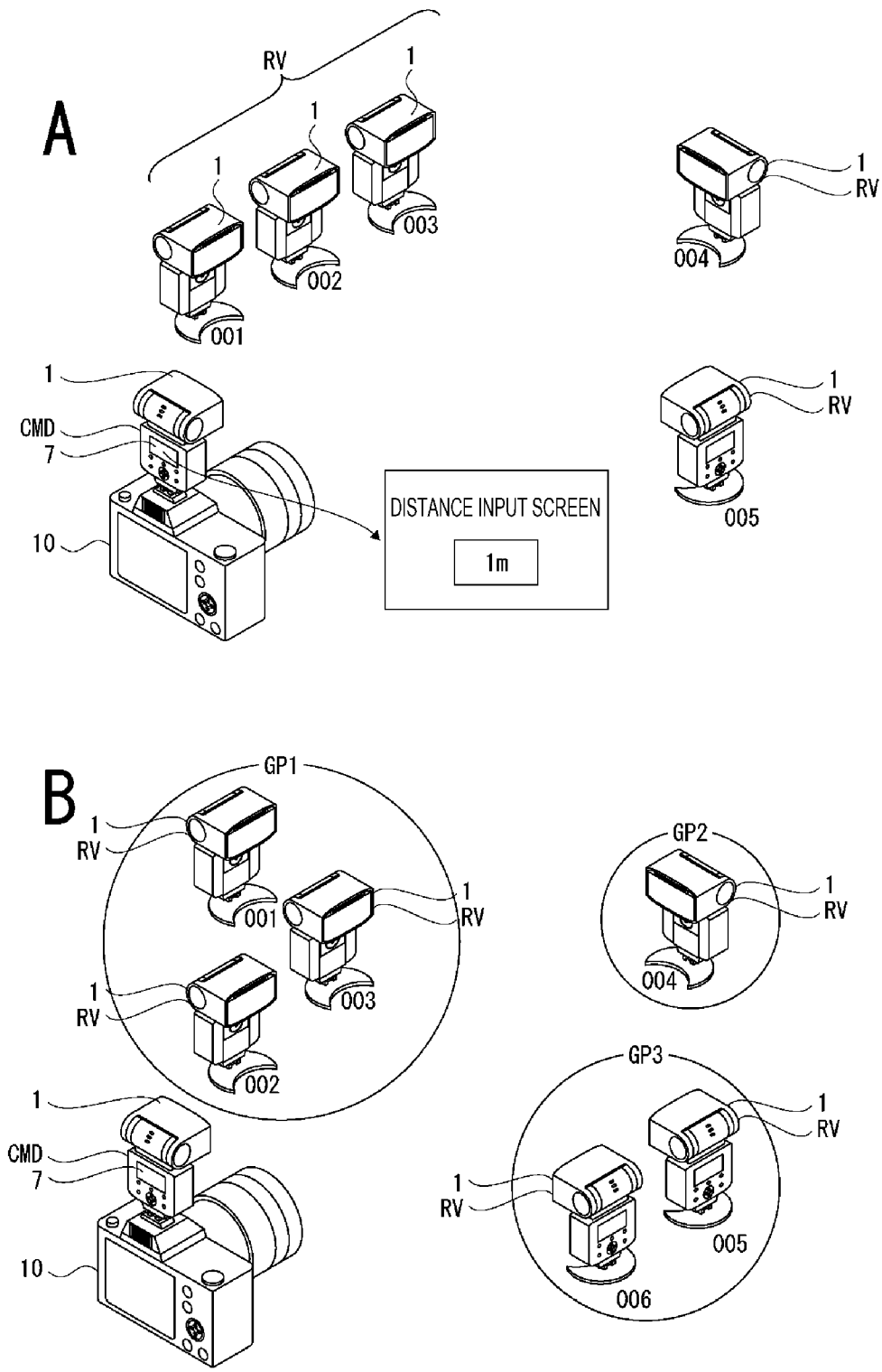

[FIG. 19]
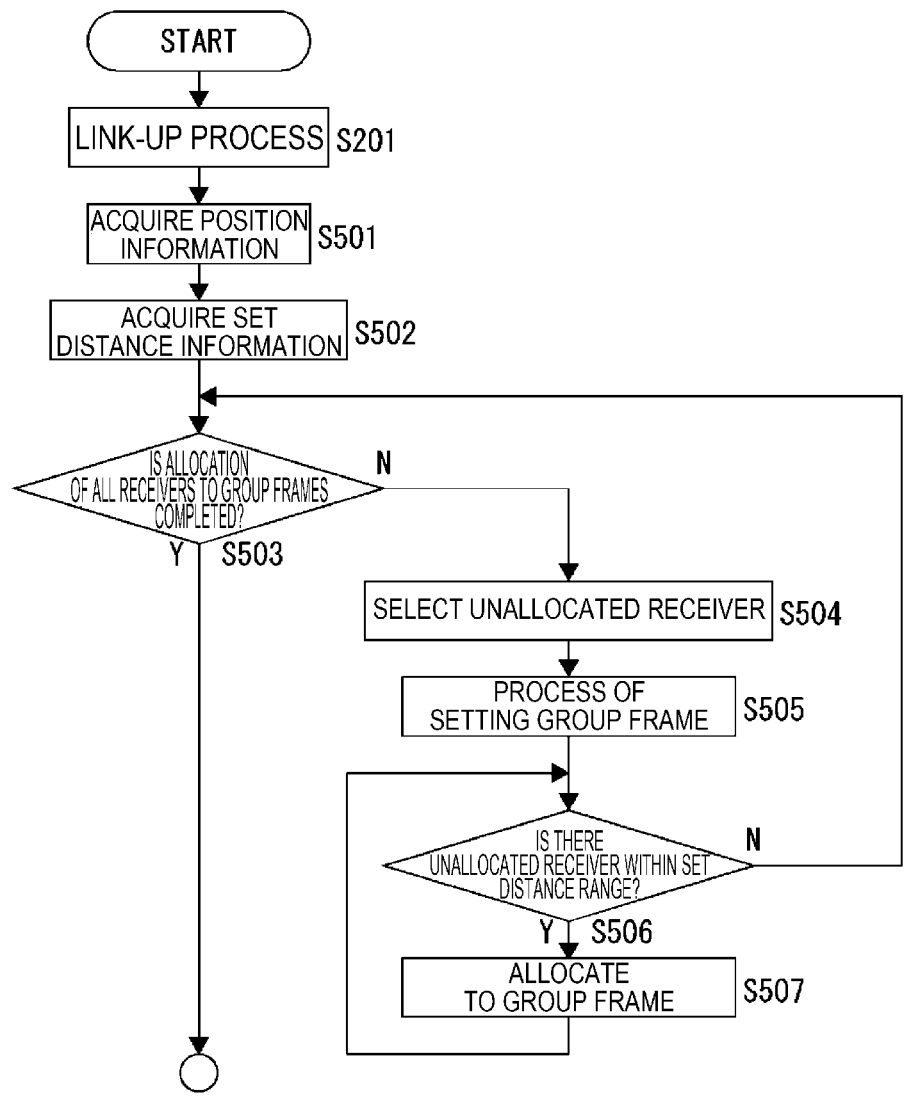

COMMUNICATION DEVICE, METHOD OF CONTROLLING COMMUNICATION DEVICE, AND COMMUNICATION SYSTEM

CROSS REFERENCE TO RELATED APPLICATIONS

This application claims the benefit of Japanese Priority Patent Application JP 2017-146773 filed Jul. 28, 2017, the entire contents of which are incorporated herein by reference.

TECHNICAL FIELD

The present technology relates to the technology fields of a communication device configured to allocate other communication devices that perform wireless communication to group frames, a method of controlling the communication device, and a communication system.

BACKGROUND ART

In a communication device that can perform wireless communication from a master device to a plurality of slave devices, groups are set by allocating respective slave devices according to a purpose, and the master device performs wireless communication in units of groups. As a communication device configured to perform such wireless communication, for example, a device described in Patent Literature 1, may be exemplified.

CITATION LIST

Patent Literature

[PTL 1]
JP 2009-186702A

SUMMARY

Technical Problem

Patent Literature 1 describes that a flash apparatus that can perform multiple-light emission through wireless communication is exemplified as a communication device, a light emitting group is set for each slave device, and when a master device causes slave devices to emit light through wireless communication, the slave devices belonging to the same light emitting group emit light in the same light emission amount and light emitting method.

In such multiple-light emission through wireless communication, when slave devices that are desired to emit light in the same light emission amount and light emitting method are set as the same light emitting group, it is necessary for a slave device that receives a light emission instruction to set a light emitting group of the slave device itself according to an operation by a user. Therefore, when a plurality of slave devices are used, time and effort are taken in order for the user to set respective light emitting groups for all slave devices by operations.

Therefore, the development of a communication device with a simple operation that does not take time and effort in grouping slave devices that perform wireless communication with a master device is desired.

Thus, the present technology is for providing a function of automatically allocating a group to a slave device by a master device that sends an instruction.

Solution to Problem

According to an embodiment of the present technology, a communication device includes: a communication unit configured to perform communication with a plurality of external communication devices; and an allocation unit configured to allocate the plurality of external communication devices to one or a plurality of group frames on a basis of information regarding the plurality of external communication devices obtained through the communication unit.

Accordingly, the communication device acquires the information regarding the external communication devices, and automatically allocates the external communication devices to the set group frames on the basis of the acquired information.

The information here includes various types of information such as attribute information of the external communication device and information regarding a state of communication with the external communication device.

The communication device according to the embodiment of the present technology may further include a setting unit configured to set an allocation type of one or the plurality of group frames serving as allocation destinations of the external communication devices.

Accordingly, a plurality of group frames are set according to the purposes of the communication device and the external communication device. Here, the allocation type refers to a type of information serving as a reference when group frames are set. Examples of the allocation type include information regarding the number of external communication devices, light emission amount information, attribute information, and position information.

In addition, in the communication device according to the embodiment of the present technology, the setting unit may set an allocation type of the one or the plurality of group frames on the basis of information regarding the external communication devices obtained through the communication unit.

Accordingly, the group in which the acquired information regarding the external communication device is applied is formed.

In addition, in the communication device according to the embodiment of the present technology, the setting unit may set an allocation type of the one or the plurality of group frames on a basis of information input by a user.

Accordingly, the communication device sets the group frames for allocating the external communication devices on the basis of information input by the user.

In addition, in the communication device according to the embodiment of the present technology, the allocation unit may allocate the external communication devices to group frames by using information regarding the number of external communication devices connected to the communication unit.

Accordingly, allocation to the group frames is automatically performed according to the information regarding the number of external communication devices.

In addition, in the communication device according to the embodiment of the present technology, the allocation unit may allocate the external communication devices to group frames by using light emission amount information of the external communication devices obtained through the communication unit.

Accordingly, allocation to the group frames is automatically performed according to the light emission amount information that the external communication device has.

In addition, in the communication device according to the embodiment of the present technology, the setting unit may set a light emission amount proportion of each group frame on the basis of information regarding the light emission amount proportion input by a user, and the allocation unit may allocate the external communication devices to group frames by using the light emission amount proportion of each group frame and the light emission amount information of the external communication devices obtained through the communication unit.

Accordingly, the group frames for allocating the external communication devices are set on the basis of information regarding the light emission amount proportion input by the user, and the external communication devices are automatically allocated to the group frames so that the input light emission amount proportions are approached.

In addition, in the communication device according to the embodiment of the present technology, the allocation unit may allocate the plurality of external communication devices to group frames in descending order of light emission amount.

Accordingly, the external communication devices are automatically allocated to the group frames in descending order of an influence on the light emission amount proportion of each group frame.

According to the embodiment of the present technology, the communication device according may include a notification unit configured to perform a process of notifying the user in accordance with a result obtained by comparing the set light emission amount proportion of each group frame with the light emission amount proportion of the external communication device allocated to each group frame.

When the external communication devices are allocated to each group frame, a difference between the light emission amount proportion of the allocated external communication device of each group and the set light emission amount proportion of each group frame may exceed an allowable range. In such a case, a process of notifying the user of the fact is performed.

In addition, in the communication device according to the embodiment of the present technology, the allocation unit may allocate the external communication devices to group frames by using attribute information of the external communication devices obtained through the communication unit, such that the plurality of external communication devices allocated to a group frame have same attributes.

Accordingly, the external communication device having attributes necessary for the purpose of the group is automatically allocated to the group frames.

In addition, in the communication device according to the embodiment of the present technology, the setting unit may set an attribute of each group frame on a basis of information input by a user, and the communication device may include a notification unit configured to perform a process of notifying the user that, as a result of allocation performed by the allocation unit, there is a group frame to which the external communication device with the set attribute has not been allocated.

When attributes of each group frame are set on the basis of information input by the user and the external communication device with attributes set for each group frame is allocated, there may be no external communication device that can be allocated to a group frame. In such a case, the user is notified of the fact.

In addition, in the communication device according to the embodiment of the present technology, the allocation unit may allocate the external communication devices to group frames by using type information of the external communication devices obtained through the communication unit such that the plurality of external communication devices allocated to group frames have same attributes.

That is, the external communication device having type information necessary for the purpose of the group is automatically allocated to the group frames.

In addition, in the communication device according to the embodiment of the present technology, the allocation unit may allocate the external communication devices to group frames using position information of the external communication devices obtained through the communication unit.

Accordingly, allocation of the external communication device to the group frames is automatically performed according to position information.

In addition, in the communication device according to the embodiment of the present technology, in a case where a new external communication device is added while or after the external communication devices are allocated to group frames, the allocation unit may allocate the added external communication device to a group frame by using information regarding the added external communication device. Accordingly, the added external communication device is also automatically allocated to the group frames.

In addition, in the communication device according to the embodiment of the present technology, the external communication device may be a light emitting device. That is, the light emitting device is automatically allocated to the group frames according to the acquired information.

According to an embodiment of the present technology, a method of controlling a communication device includes: performing communication with a plurality of external communication devices; and allocating the plurality of external communication devices to one or a plurality of group frames on a basis of information regarding the plurality of external communication devices obtained through the communication.

Accordingly, the communication device acquires information regarding an external communication device, and automatically allocates the external communication device to the set group frames on the basis of the acquired information. When the external communication device is allocated to the group frames, a group in which the acquired information is applied is formed.

Advantageous Effects of Invention

According to the embodiment of the present technology, the communication device automatically allocates external communication devices to group frames on the basis of the acquired information regarding the external communication devices. Therefore, an operation by a user can become easier and convenience can be improved.

Moreover, the effects described herein are not necessarily restrictive, and any advantageous effects described in the present disclosure can be taken.

BRIEF DESCRIPTION OF DRAWINGS

FIG. 1 is an explanatory diagram of a configuration of a flash apparatus of an embodiment of the present technology.

FIG. 2 is an explanatory diagram of a configuration of a camera device of an embodiment of the present technology.

FIG. 3 is an explanatory diagram of a mode in which a commander and receivers according to an embodiment of the present technology are used.

FIG. 4 is a block diagram showing a functional configuration of a flash apparatus of an embodiment of the present technology.

FIG. 5 is a block diagram showing a functional configuration of a camera device of an embodiment of the present technology.

FIG. 6 is an explanatory diagram of a wireless flash system of a first embodiment of the present technology.

FIG. 7 is a flowchart of the first embodiment of the present technology.

FIG. 8 is an explanatory diagram of a wireless flash system of a second embodiment of the present technology.

FIG. 9 is a flowchart of a first example in the second embodiment of the present technology.

FIG. 10 is an explanatory diagram of light emission amount information that is acquired in the second embodiment of the present technology.

FIG. 11 is a flowchart of a second example in the second embodiment of the present technology.

FIG. 12 is a flowchart of a third example in the second embodiment of the present technology.

FIG. 13 is an explanatory diagram of a wireless flash system of a third embodiment of the present technology.

FIG. 14 is a flowchart of a first example in the third embodiment of the present technology.

FIG. 15 is an explanatory diagram of attribute information that is acquired in the third embodiment of the present technology.

FIG. 16 is a flowchart of a second example in the third embodiment of the present technology.

FIG. 17 is a flowchart of a third example in the third embodiment of the present technology.

FIG. 18 is an explanatory diagram of a wireless flash system of a fourth embodiment of the present technology.

FIG. 19 is a flowchart of the fourth embodiment of the present technology.

DESCRIPTION OF EMBODIMENTS

Embodiments will be described below in the following order.
<1. Overview of flash apparatus>
<2. Overview of camera device>
<3. Method of using flash apparatus and camera device>
<4. Configuration of flash apparatus>
<5. Configuration of camera device>
<6. First embodiment>
<7. Second embodiment>
<8. Third embodiment>
<9. Fourth embodiment>
<10. Summary and modified examples>

Here, the meanings of terms used are as follows.

A commander refers to a communication device in the claims, and is particularly a flash apparatus mounted on a camera device in the present embodiment. The commander automatically allocates receivers to group frames to be described below on the basis of information input by a user. In addition, the commander can transmit an instruction to the receiver for each group. Here, of course, the commander can individually transmit an instruction for each receiver.

The receiver refers to an external communication device in the claims, and is a communication device configured to perform an operation according to an instruction from the commander. In the example of the present embodiment, a flash apparatus that is not mounted on a camera device will be described as the receiver.

The group frame refers to a virtual frame for allocating receivers, which is set on the basis of acquired information. A group is formed by allocating receivers to group frames.

Hereinafter, as an embodiment to which the present technology is applied according to the drawings, a wireless flash system using a flash apparatus and a camera device will be described.

1. Overview of Flash Apparatus

A configuration of a flash apparatus 1 will be described with reference to FIG. 1. A of FIG. 1 is an exterior perspective view of the flash apparatus 1 when viewed from the front side and B of FIG. 1 is an exterior perspective view of the flash apparatus 1 when viewed from the back side.

The flash apparatus 1 includes a flash main body 2 and a light emitting unit 3.

As shown in A of FIG. 1, the flash main body 2 is formed in, for example, a substantially rectangular parallelepiped shape, and the light emitting unit 3 is provided above the flash main body 2. The light emitting unit 3 is provided to be rotatable in vertical and horizontal directions with respect to the flash main body 2. Accordingly, the light emitting unit 3 can perform bounce imaging in which flash light is not directly emitted to a subject but it is emitted toward a ceiling or a wall of a room. When a configuration in which such bounce imaging is possible is provided, it is possible to present lighting according to various compositions and imaging scenes.

In addition, when the light emitting unit 3 is provided to be rotatable, it is easy to adjust a light emission direction of the flash apparatus 1 placed on the ground and adjust a light emission direction of the flash apparatus 1 that is extended using a sync cable or the like.

A light emission section 4 is provided on a front surface of the light emitting unit 3. In the present embodiment, as an example, the light emission section 4 includes a Fresnel lens and a xenon tube is disposed therein. Flash light is emitted through the Fresnel lens of the light emission section 4. Here, a case in which a light emitting diode (LED) is used as the light emission section 4 may also be conceived.

A fixed part 5 is provided below the flash main body 2. A terminal 5a for performing wired communication with a camera device 10 is disposed below the fixed part 5.

When the fixed part 5 of the flash apparatus 1 is mounted on a fixing part 16 provided in the camera device 10 (to be described below), the flash apparatus 1 and the camera device 10 are connected so that wired communication is possible and the flash apparatus 1 is fixed to the camera device 10.

An auxiliary light window 6 is provided on a front surface of the flash main body 2. The auxiliary light window 6 is a window that includes a projection lens for projecting auxiliary light that assists autofocusing of a camera by illuminating a subject when the subject is dark. To project auxiliary light, for example, an LED is mounted.

A control circuit for controlling the entire flash apparatus 1 and the like is provided in the flash main body 2.

In addition, an antenna for wireless radio communication is provided in the flash main body 2, and model information and the like are transmitted from the flash apparatus 1 serving as a receiver to the flash apparatus 1 serving as a commander or the camera device 10 through wireless communication. In addition, when a signal is transmitted from the commander side through wireless communication, it is possible to cause the receiver to emit light.

As shown in B of FIG. 1, a flash display unit 7, an operation button 8a, a menu button 8b, a mode button 8c, a zoom button 8d, a charging/test button 8e, and a power supply switch 8f are disposed on a back surface of the flash main body 2. The flash display unit 7 is a display device, for example, a liquid crystal display (LCD) device or an organic light emitting diode (OLED) device.

The operation button 8a includes direction keys provided in up, down, left and right directions and an OK button provided at the center of the direction keys. It is possible to move a cursor displayed on the display unit by operating the direction keys. In addition, a selected item is confirmed by operating the OK button.

The menu button 8b is an operation unit for setting a menu mode. When the menu button 8b is operated, a menu screen is displayed on the display unit, and desired setting and the like can be performed by operating the operation button 8a in this state.

The mode button 8c is an operation unit for setting an operation mode of the flash apparatus 1 and is a button for setting various modes of light emission control of the flash apparatus 1, for example, a TTL auto mode, an auto mode, a manual mode, and a wireless remote control mode. The wireless remote control mode is an operation mode that can be selected when a receiver is used.

The zoom button 8d is an operation unit for setting an illumination angle in light emission by the light emitting unit 3. The illumination angle is a range in which flash light is uniformly emitted with a certain brightness or higher, which is represented by an angle.

The charging/test button 8e shines when charging of the flash apparatus 1 is completed, and test light emission of the flash apparatus 1 is performed by pressing the charging/test button 8e. In addition, the power supply switch 8f is an operation unit for supplying power to the flash apparatus 1.

2. Overview of Camera Device

Next, a configuration of the camera device 10 will be described with reference to FIG. 2. A of FIG. 2 is an exterior perspective view of the camera device 10 when viewed from the front side and B of FIG. 2 is an exterior perspective view of the camera device 10 when viewed from the back side.

The camera device 10 includes an image pickup device and can record image data in a recording medium based on an output from the image pickup device. In addition, when a subject is observed, the subject is displayed in real time on a camera display unit 18 or a finder 17 provided on the back surface on the basis of image data.

A lens unit 12 is mounted on substantially the center of a front surface of a camera body part 11. An imaging lens 13 for forming a subject image is disposed on the lens unit 12.

A zoom lens is provided in a lens barrel, and a zooming operation can be performed by rotating a zoom ring 12a.

A shutter button 14, a power supply button 15, the fixing part 16, and the finder 17 are provided above the camera body part 11. The shutter button 14 is an operation unit for instructing a still image or the like to be captured and the power supply button 15 is an operation unit for supplying power to the camera body part 11.

The fixing part 16 of the camera device 10 can be engaged with the fixed part 5 of the flash apparatus 1, and as shown in FIG. 3, the flash apparatus 1 can be fixed to the camera device 10.

A terminal 16a for communication is provided on an upper surface of the fixing part 16, and the camera device 10 and the flash apparatus 1 perform wired communication through the terminal 16a.

In addition, an antenna for wireless communication (not shown) is provided in the camera body part 11. Wireless communication with the flash apparatus 1 can be performed through the antenna. Thus, the camera device 10 functions as a commander, and when a control signal is transmitted to a receiver (the flash apparatus 1) that is not mounted, it is possible to cause the receiver (the flash apparatus 1) to emit light.

Here, although not shown, the camera device 10 may have a built-in flash function. In this case, the built-in flash can serve as a light source when imaging is performed using only the camera device 10 or can emit a light signal as a commander to the receiver when imaging is performed with a wireless flash.

The finder 17 is provided above a back surface of the camera body part 11. A subject image formed by the imaging lens 13 can be observed from the finder 17 through a finder optical system such as a movable reflecting mirror, a finder screen, and a pentaprism in the camera body part 11.

In addition, the camera display unit 18, an operation button 19, a menu button 20, a mode button 21, a DSP button 22, and an INFO button 23 are provided on a back surface of the camera body part 11. The camera display unit 18 reproduces a captured image that is recorded and displays a screen for setting various types of information and a live view image.

Similarly to the operation button 8a shown in B of FIG. 1, the operation button 19 includes direction keys provided in four up, down, left and right directions and an OK button provided at the center of the direction keys. It is possible to move a cursor displayed on the camera display unit 18 by operating the direction keys, and an item is selected by operating the OK button.

Similarly to the menu button 8b shown in B of FIG. 1, the menu button 20 is an operation unit for setting a menu mode.

The mode button 21 is an operation unit for switching an imaging mode of the camera device 10 such as a program mode, an aperture priority mode, a shutter priority mode, and a manual mode.

The DSP button 22 is an operation unit for switching a live view displayed on the camera display unit 18 on or off. The INFO button 23 is an operation unit for switching a display form of information displayed on the camera display unit 18. Here, the structure of the flash apparatus 1 and the camera device 10 described above is shown as an example of the present embodiment, but the present technology is not limited to the above structure. The flash apparatus 1 and the camera device 10 can have various structures as long as the present technology can be implemented.

3. Method of Using Flash Apparatus and Camera Device

Next, a wireless flash system using a commander and receivers will be described with reference to FIG. 3.

In lighting with the flash apparatus 1 that is directly attached to the camera device 10, a strong shadow may appear in the background and the image may become a planar depiction, and there may be a limitation on the range of expression. Therefore, the wireless flash system is used for more creative expression. For example, when light is shined from a side of a subject using the flash apparatus 1 that is not mounted on the camera device 10, a three-dimensionally shadowed image with conspicuous outlines can be realized.

The wireless flash system includes one commander and one or a plurality of receivers. Hereinafter, the flash apparatus 1 attached to the camera device 10 will be referred to as a commander CMD and four flash apparatuses 1 of off-cameras will be referred to as receivers RV. The commander CMD and the receivers RV each have a wireless communication function and can exchange various types of information.

In the example shown in FIG. 3, among the four receivers RV, three receivers RV are allocated to a group GP1 and one receiver RV is allocated to a group GP2. Here, the number of groups to which receivers RV are allocated may be two or more or may be one. In addition, the number of receivers RV to be allocated to a group frame may be two or more or may be one.

By operating the commander CMD, a user can cause the receiver RV to perform an operation such as light emission through wireless communication without wiring connection. In this manner, when receivers RV are allocated to group frames, one or a plurality of flash apparatuses 1 as receivers RV can be installed at appropriate places according to a purpose, and it is possible to freely control a light emission amount and light emission timing for each group according to an operation of the commander CMD.

In such a technology, when receivers RV are allocated to group frames, it is necessary for the user to perform an operation on the side of the receiver RV that receives a light emission instruction. This work takes time and effort for the user when there are a plurality of receivers RV.

In addition, for example, when group frames are set so that each group has a predetermined light emission amount proportion, the user is assumed to know a performance for each receiver RV. Therefore, when the user does not know a performance for each receiver RV, it is necessary to check the performance of the receivers RV and set group frames. If there is no checking method, it is difficult to set group frames in consideration of the user's purpose.

Therefore, in the embodiment of the present technology, the following configuration is used in order to solve the above problem.

4. Configuration of Flash Apparatus

An internal configuration of the flash apparatus 1 functioning as the commander CMD or the receiver RV in the embodiment of the present technology will be described with reference to FIG. 4. FIG. 4 is a block diagram of the flash apparatus 1 in an embodiment.

As shown in FIG. 4, the flash apparatus 1 includes a flash control unit 30, a memory unit 31, a light emission section 32, a light emission control circuit 33, a photometric sensor 34, an operation input unit 35, a display control unit 36, the flash display unit 7, a connector part 37, a communication unit 38, a power supply unit 39, and a positioning unit 40.

The flash control unit 30 includes a microcomputer (arithmetic processing unit) with a central processing unit (CPU). The flash control unit 30 performs various controls such as of light emission of the flash apparatus 1 according to information from the photometric sensor 34, the connector part 37, the communication unit 38, and the like and an operation from the operation input unit 35.

In addition, in the present embodiment, the flash control unit 30 has functions of a setting unit 30a, an allocation unit 30b, and a notification unit 30c as, for example, functions that are implemented by software.

The setting unit 30a sets one or a plurality of group frames which are allocation destinations of the receivers RV. The group frame is set when the user operates the commander CMD. The setting unit 30a sets a group frame on the basis of information input by the user received from the operation input unit 35.

Examples of the information input by the user include the number of receivers RV to be allocated to a group frame, a light emission amount proportion for each group frame, and a purpose of use for each group frame.

As an input example of the information input by the user, for example, in the case of the number of receivers RV to be allocated to a group frame, if "three receivers RV for the group GP1 and one receiver RV for the group GP2" is input, group frames of the group GP1 and the group GP2 are set accordingly.

The allocation unit 30b allocates receivers RV to group frames set by the setting unit 30a on the basis of information regarding a plurality of receivers RV obtained through the communication unit 38 to be described below.

For example, when the setting unit 30a sets group frames on the basis of the number of receivers RV to be allocated, the allocation unit 30b allocates receivers RV to group frames on the basis of information regarding the number of plurality of receivers RV obtained through the communication unit 38.

Accordingly, without the user setting the group frames by performing an input operation for each receiver RV to be installed, it is possible to automatically allocate the receivers RV to the group frames according to settings on the side of the commander CMD.

When the allocation unit 30b allocates receivers RV to group frames, if allocation to group frames is not appropriately performed, the notification unit 30c performs a process for notifying of the fact. For example, the notification unit 30c causes the flash display unit 7 to display notification content through the display control unit 36 and thus provides a notification to the user.

When allocation to group frames is not appropriately performed, the notification unit 30c generally performs a process for notifying of the fact, but may not perform a notification process.

Cases in which allocation to group frames is not appropriately performed include, for example, a case in which there is a large difference between a light emission amount proportion of each group frame set and a light emission amount proportion of receivers RV to be allocated for each group and a case in which a result of allocation by an allocation unit 30d is that there is no receiver RV necessary for a group frame.

Functions of the setting unit 30a, the allocation unit 30b, and the notification unit 30c described above may be independently realized by a program or a plurality of function processes may be executed by one program. In addition, one function may be implemented in connection with a plurality of program modules.

The memory unit 31 comprehensively indicates a read only memory (ROM), a random access memory (RAM), a flash memory, and the like, as a part to store information or the like that is used for the processing to be performed by the flash control unit 30. The memory unit 31 may be a memory area built in a microcomputer chip serving as the flash control unit 30, or may be constituted by a separate memory chip.

The flash control unit 30 centrally controls the entire flash apparatus 1 by executing programs stored in the ROM, the flash memory, or the like of the memory unit 31. The RAM in the memory unit 31 serves as a working area when various data of the CPU is processed and is used for temporarily storing data, programs, or the like. The ROM or the flash memory (nonvolatile memory) in the memory unit 31 is used to store application programs for various operations, firmware, or the like in addition to an operating system (OS) for the CPU to control each units or a content file such as an image file.

The light emission section 32 includes, for example, a xenon (Xe) tube. The light emission control circuit 33 includes a capacitor and the like, accumulates energy for the light emission section 32 to emit light, and controls a light emission amount of the light emission section 32 such that it is a light emission amount set by the flash control unit 30.

When a light emission request signal from the commander CMD is received through the communication unit 38 or the connector part 37 of the receiver RV, the flash control unit 30 transmits a light emission instruction to the light emission control circuit 33, discharges the xenon tube, and causes the light emission section 32 to emit light. When the flash apparatus 1 is mounted on the camera device 10, the connector part 37 transmits a light emission request signal from a camera control unit 50 to be described below to the flash control unit 30.

The photometric sensor 34 detects a light intensity around a subject, reflected light from the subject due to light emission from the auxiliary light window 6, and the like. An analog electrical signal based on the detected reflected light is converted into a digital signal by an A/D converter (not shown). The flash control unit 30 adjusts a light emission amount during flashing on the basis of the converted digital signal. Here, the photometric sensor 34 can be provided in the camera device 10. Accordingly, the photometric sensor 34 can more accurately detect a light intensity around the subject, reflected light from the subject, and the like through a camera lens of the camera device 10.

The operation input unit 35 includes various buttons including the operation button 8a, the menu button 8b, the mode button 8c, the zoom button 8d, the charging/test button 8e and the power supply switch 8f shown in FIG. 1, a switch, and the like. In response to an input operation by the user with respect to the operation input unit 35, the flash control unit 30 causes respective components to implement necessary operations.

The display control unit 36 controls generation of a screen displayed on the flash display unit 7 and display on the flash display unit according to control information received from the flash control unit 30.

For example, information regarding the flash apparatus 1 itself, information regarding the camera device 10 attached to the flash apparatus 1, information regarding a group set when the wireless flash system is used, and the like are displayed on the flash display unit 7. In addition, the display control unit 36 causes various operation menus, icons, messages, and the like, that is, graphical user interfaces (GUI), to be displayed on a screen of the flash display unit 7.

When the flash apparatus 1 and the camera device 10 are engaged by fitting the fixed part 5 to the fixing part 16, the connector part 37 transmits and receives signals between the flash apparatus 1 and the camera device 10. For example, when a light emission request signal is input from the camera device 10, the light emission request signal is transmitted to the flash control unit 30 through the connector part 37.

The communication unit 38 performs wireless communication with another flash apparatus 1 or camera device 10. The flash control unit 30 in the flash apparatus 1 as the commander CMD acquires various types of information such as attributes of the receiver RV through the communication unit 38. In addition, the flash control unit 30 as the commander CMD transmits a light emission request signal received from the camera device 10 to the receiver RV through the communication unit 38. The flash control unit 30 in the flash apparatus 1 as the receiver RV receives light emission drive information through the communication unit 38 and transmits various types of information to the commander CMD.

The commander CMD acquires information regarding receivers RV which are all or some of other communication devices to be connected via wireless communication through the communication unit 38. For example, the commander CMD acquires various types of information such as light emission amount information, attribute information, position information, and the like of the receiver RV to be connected via wireless communication through the communication unit 38. The attribute information refers to various types of information used for allocating an external communication device (receiver RV) to a set group frame. Examples of the attribute information include various types of information such as a model number, a light emission type, an operation mode, a flash time, a light emission interval, an availability of bounce imaging, an operating temperature, external sizes, a weight, and a power consumption. In addition, the type information refers to information regarding a function of an external communication device (receiver RV) within the attribute information, and includes, for example, a main light function, an auxiliary light function, a wide panel function, and a remote lens function.

Here, a light emission request signal to the receiver RV can be directly transmitted from the camera device 10 to the receiver RV. In addition, in the flash apparatus 1 as the commander CMD and the camera device 10 described above, in place of wired communication through the connector part 37, wireless communication may be performed through the communication unit 38.

The power supply unit 39 uses, for example, a voltage of a built-in battery or a DC voltage that is converted by an AC adapter connected to a commercial AC power supply and input, for supply of power, generates a power supply voltage necessary for respective components, and supplies the voltage as an operation voltage.

The positioning unit 40 acquires position information of the flash apparatus 1 itself and transmits the position information to the flash control unit 30. The positioning unit 40 acquires, for example, GPS position information of the flash apparatus 1 from a global positioning system (GPS). When the GPS position information is used, for example, the positioning unit 40 regularly acquires latitude information and longitude information as a current position from information received by GPS receivers, and transmits this information to the flash control unit 30.

When the flash apparatus 1 is the receiver RV, the flash control unit 30 transmits position information of the receiver RV to the commander CMD through the communication unit 38.

Here, the positioning unit 40 has a function that is used when receivers RV are allocated to group frames using position information in a fourth embodiment to be described below. Therefore, in the embodiment of the present technology, the positioning unit 40 is not a necessary component.

5. Configuration of Camera Device

An internal configuration of the camera device 10 will be described with reference to FIG. 5. FIG. 5 is a block diagram showing a functional configuration of the camera device 10 of the embodiment.

The camera device 10 includes an imaging unit 51, an image signal processing unit 52, a recording unit 53, an output unit 54, a power supply unit 55, a memory unit 56, an operation input unit 57, a display control unit 58, the finder 17, the camera display unit 18, a connector part 59, and a communication unit 60.

The imaging unit 51 includes an image pickup device, and the image pickup device has, for example, a charge coupled device (CCD) type or a complementary metal oxide semiconductor (CMOS) type.

In the imaging unit 51, for example, correlated double sampling (CDS) processing, automatic gain control (AGC) processing, and the like are performed on an electrical signal obtained by photo-electrically converting received light, and additionally, analog/digital (A/D) conversion processing is performed. Then, an imaging signal as digital data is output to the image signal processing unit 52 in the subsequent stage.

The image signal processing unit 52 includes an image processing processor, for example, a digital signal processor (DSP). The image signal processing unit 52 performs various types of signal processing on a digital signal (captured image signal) from the imaging unit 51. For example, the image signal processing unit 52 performs preprocessing, synchronization processing, YC generation processing, resolution conversion processing, codec processing, and the like.

In the preprocessing, clamping processing in which R, G, B black levels are clamped to a predetermined level and correction processing between R, G, B color channels are performed on a captured image signal from the imaging unit 51.

In the synchronization processing, demosaic processing is performed so that image data of pixels has all R, G, B color components.

In the YC generation processing, a luminance (Y) signal and a color (C) signal are generated (separated) from R, G, B image data.

In the resolution conversion processing, resolution conversion processing is performed on image data on which various types of signal processing are performed. In the codec processing, for example, encoding processing for recording or communication is performed on resolution-converted image data.

The recording unit 53 includes, for example, a nonvolatile memory, and stores image files (content files) such as still image data and moving image data, attribute information of image files, thumbnail images, and the like.

For example, the image file is stored in a format such as a joint photographic experts group (JPEG), a tagged image file format (TIFF), or a graphics interchange format (GIF).

Various actual forms of the recording unit 53 can be conceived. For example, the recording unit 53 may have a form of a flash memory built into the camera device 10, a memory card (for example, a portable flash memory) that is detachable from the camera device 10, or a card recording and reproducing unit configured to perform recording on and reproducing access for the memory card. In addition, the recording unit 53 may be realized as a hard disk drive (HDD) as a form built into the camera device 10.

The output unit 54 performs data communication and network communication with an external device through wired or wireless communication.

For example, the output unit 54 transmits and outputs captured image data (still image files and moving image files) to an external display device, recording device, reproducing device, or the like.

In addition, the output unit 54 as a network communication unit performs communication via various networks, for example, the Internet, a home network, and a local area network (LAN), and may transmit and receive various types of data to and from servers, terminals, and the like on the network.

The power supply unit 55 uses, for example, a voltage of a built-in battery or a DC voltage that is converted by an AC adapter connected to a commercial AC power supply and input, for supply of power, and generates a power supply voltage necessary for respective components, and supplies the voltage as an operation voltage.

The operation input unit 57 includes various buttons, a switch, and the like shown in FIG. 2. In response to an input operation by the user with respect to the operation input unit 57, the camera control unit 50 implements various operations.

The display control unit 58 controls display operations in the finder 17 and the camera display unit 18. For example, the display control unit 58 causes the camera display unit 18 to execute various types of displaying on the basis of an instruction of the camera control unit 50. The display control unit 58 causes the camera display unit 18 to reproduce and display still images or moving images that are captured and recorded in a recording medium (the recording unit 53), and to display a through image (subject monitoring image) as a moving image according to captured image data with frames captured during standby of release (shutter operation) or during standby of moving image capturing. In addition, the display control unit 58 causes various operation menus, icons, messages, and the like, that is, GUIs, to be displayed on a screen of the camera display unit 18.

The connector part 59 transmits and receives signals between the flash apparatus 1 and the camera device 10 on which the flash apparatus 1 is mounted. In the flash apparatus 1 and the camera device 10, the connector part 59 and the connector part 37 are engaged, and the fixed part 5 to the fixing part 16 are fitted.

For example, when a light emission request signal is input from the camera device 10, the light emission request signal is transmitted to the flash control unit 30 through the connector part 59 and the connector part 37.

The camera control unit 50 includes a microcomputer (arithmetic processing unit) having a CPU.

The memory unit 56 comprehensively indicates, for example, a ROM, a RAM, and a flash memory, as parts in which information and the like used for processing performed by the camera control unit 50 are stored. The memory unit 56 may be a memory area built into a microcomputer chip as the camera control unit 50 or may be constituted by a separate memory chip.

The camera control unit 50 comprehensively controls the entire camera device 10 by executing a program stored in a ROM, a flash memory, or the like of the memory unit 56.

For example, the camera control unit 50 controls operations of necessary components including control of a shutter speed of the imaging unit 51, instruction of various types of signal processing in the image signal processing unit 52, an imaging operation or recording operation according to an operation of the user, a reproduction operation of a recorded image file, a camera operation such as zooming, focusing, and exposure adjustment, a user interface operation, and the like. In addition, the camera control unit 50 in the embodiment of the present technology also functions as a communication control unit configured to control the communication unit 60 to be described below.

The RAM in the memory unit 56 serves as a working area when various types of data are processed in the CPU and is used to temporarily store data, programs, and the like.

The ROM or the flash memory (nonvolatile memory) in the memory unit 56 is used to store application programs for various operations, firmware, and the like in addition to an OS for the CPU to control respective components and a content file such as an image file.

The communication unit 60 performs wireless communication with the flash apparatus 1. The camera control unit 50 in the camera device 10 as the commander CMD acquires various types of information such as attributes of the flash apparatus 1 as the receiver RV through the communication unit 60. In addition, the camera control unit 50 as the commander CMD transmits a light emission request signal to the receiver RV through the communication unit 60.

6. First Embodiment

As the first embodiment, a process of the commander CMD allocating receivers RV to group frames will be described with reference to FIG. 6 and FIG. 7.

In the first embodiment, the commander CMD sets group frames on the basis of information regarding the number of receivers RV input by the user and allocates the receivers RV to the set group frames. Accordingly, the user can automatically allocate the group frames by inputting the number of receivers RV to be allocated for each group frame to the commander CMD.

In the first embodiment, the flash apparatus 1 attached to the camera device 10 is set as the commander CMD, and the other flash apparatuses 1 are set as receivers RV. This similarly applies to a second embodiment to a fourth embodiment to be described below.

In A of FIG. 6, as an example, five receivers RV to be allocated to group frames are provided, and the receivers RV are assigned with an identification ID of 001 to 005 (hereinafter, for example, a receiver RV with ID 00X will be denoted as a receiver 00X).

First, when the user operates various buttons of the commander CMD, a group frame setting screen 70 is displayed on the flash display unit 7. The user inputs the number of receivers RV necessary for each group frame by operation. Accordingly, group frames for receiver RVs that the flash control unit 30 as the commander CMD allocates are set.

In A of FIG. 6, as an example, a group GP1 including two receivers RV and a group GP2 including one receiver RV are set as group frames according to the input operation by the user.

When setting of group frames according to the operation input by the user to the commander CMD is completed, the commander CMD automatically allocates the receivers RV to the group frames. When allocation to the group frames is completed, as shown in B of FIG. 6, an allocation result screen 71 of the receivers RV is displayed on the flash display unit 7 of the commander CMD.

Here, two receivers RV001 and 002 are allocated to the group GP1, and one receiver RV003 is allocated to the group GP2. In addition, the remaining receivers RV004 and 005 that have not been allocated to the group frames are displayed as receivers RV with a group frame setting off (group off) on the allocation result screen 71.

In this manner, without the user setting the group frames by performing an input operation for each receiver RV to be installed, it is possible to automatically allocate the receivers RV to the group frames by simply setting the group frames according to the operation input by the user to the commander CMD.

After allocation of the receivers RV to the group frames is completed, the user installs the receivers RV (the receivers RV001 to RV003) that have been allocated to the group frames at arbitrary positions. The user controls operations of the disposed receivers RV for each group by operating the commander CMD.

For example, when imaging is performed by the camera device 10 that is attached to the commander CMD, the receiver RV of the group GP1 is caused to emit light and the receiver RV of the group GP2 is caused not to emit light, and vice versa. In addition, it is possible to instruct whether both the group GP1 and the group GP2 emit light. Moreover, it is possible to cause the receivers RV of the group GP1 and the group GP2 to emit light sequentially.

A process performed by the flash control unit 30 as the commander CMD in order to implement automatic allocation of the receivers RV to the group frames as described above will be described with reference to FIG. 7.

First, before the allocation process is performed, the flash control unit 30 performs a pairing process with receivers RV in step S101 in A of FIG. 7. The pairing process is a process of transmitting and receiving a communication ID and channel information between the flash control unit 30 and a receiver RV and associating the commander CMD with the receiver RV. If the pairing process is performed in advance, when the commander CMD performs communication with the receiver RV, it is possible to prevent crosstalk with another external communication device.

The flash control unit 30 stores information regarding the communication ID acquired from the receiver RV in the pairing process in the memory unit 31 or the like. The stored information remains in a stored state before a deleting process is performed by the flash control unit 30 according to an input operation by the user or the like, and is kept even if power is turned OFF. For example, the flash apparatus 1 as the commander CMD performs the pairing process with five flash apparatuses 1 as receivers RV001 to RV005 as shown in A of FIG. 6.

Next, a process of automatically allocating receivers RV to group frames will be described with reference to B of FIG. 7.

When the commander CMD is in a wireless remote control mode according to an operation by the user, the flash control unit 30 performs a link-up process with receivers RV in step S201. The link-up process is a process of setting a state in which the commander CMD and the receivers RV can communicate. That is, the link-up process is a process of wirelessly connecting the commander CMD and the receivers RV. In the example shown in B of FIG. 6, the commander CMD and five receivers RV are wirelessly connected.

According to the link-up process, the flash control unit 30 can ascertain the number of receivers RV subjected to the link-up process. That is, the flash control unit 30 acquires information regarding the number of receivers RV that can be allocated to group frames. Here, the flash control unit 30 ascertains that there are a plurality of receivers RV in a link-up state, counts the receivers RV in the link-up state, and thus calculates the number of receivers RV that can be allocated to the group frames. Here, the flash control unit 30 stores information regarding the number of receivers V in the link-up state in the memory unit 31 or the like, and can ascertain the number of receivers RV with reference to the number information.

Here, a link-up state of the commander CMD and the receiver RV is released when the power of either is turned off. Therefore, when the power is turned on again, the link-up process is performed by the flash control unit 30 again.

In addition, the flash control unit 30 acquires information regarding the number of receivers RV to be allocated input by the operation by the user in step S202, and sets the group frames on the basis of the number information. For example, when the user inputs the number of receivers RV to be allocated on the group frame setting screen 70 in FIG. 6, the group GP1 with two receivers RV to be allocated and the group GP2 with one receiver RV to be allocated are set.

After the group frames are set, the flash control unit 30 determines whether there is an unallocated receiver RV that has not yet been allocated to the group frames in step S203.

When there is an unallocated receiver RV, the process of the flash control unit 30 advances to step S204, and it is determined whether allocation of the receivers RV to a group GPx has been completed.

In the group GPx, x denotes a natural number, and indicates each group frame set in step S202. In addition, the maximum value of the group frames is set as a group GPmax. In the example shown in A of FIG. 6, since the group GP1 and the group GP2 are provided as the group frames, the group GPmax is 2.

In step S204, when allocation to the group GPx is not completed, the flash control unit 30 selects the unallocated receiver RV in step S205 and allocates it to the group GPx in step S206.

Then, the process of the flash control unit 30 returns to step S203, and the processes of steps S203 to S206 are repeated until there is an unallocated receiver RV and allocation of the receivers RV to the group GPx is completed. Accordingly, all receivers RV necessary for this group frame have been allocated and the group GPx is formed.

When allocation of the receivers RV to the group GPx is completed in step S204, the process of the flash control unit 30 advances to step S207.

The flash control unit 30 determines whether the group GPx is the group GPmax (GPx=GPmax) in step S207. That is, the flash control unit 30 determines whether allocation of the receivers RV to all of the set group frames has been completed. When there is a group frame for which allocation of the receivers RV has not yet been completed, the flash control unit 30 adds 1 to x in GPx (x←x+1) in step S208. That is, a target to which the receivers RV are allocated is changed to the next group frame.

Then, the process of the flash control unit 30 returns to step S203 and the processes of steps S203 to S206 are repeated until there is an unallocated receiver RV and allocation of the receivers RV to the changed group frame is completed.

In step S208, when GPx=GPmax is satisfied, the flash control unit 30 determines that allocation of the receivers RV to all group frames is completed and the process advances to step S209.

In step S209, the flash control unit 30 performs a group off process for remaining unallocated receivers that have not been allocated to a group frame. The group off process is a process in which a receiver RV that has not been allocated to a group frame waits while a link-up state in which communication is possible is maintained. The flash control unit 30 maintains a link-up state of the unallocated receiver such that allocation can be immediately performed when the user sets the group frames by input again.

For example, the flash control unit 30 displays the receiver RV subjected to the group off process on the allocation result screen 71 as a group off receiver RV.

After the process of step S209, the process of the flash control unit 30 returns to step S203.

In step S203, when it is determined that there is no unallocated receiver RV, the process of the flash control unit 30 advances to step S210.

The flash control unit 30 determines whether there is a group frame for which allocation of the receivers RV has not been completed in step S210.

When allocation of the receivers RV to the group frames is completed, the flash control unit 30 terminates a process of performing allocation to the group frames. Accordingly, for example, as shown in B of FIG. 6, allocation to the group frames is completed.

When there is a group frame for which allocation of the receivers RV has not been completed, the flash control unit 30 performs a process of notifying of the fact in step S210. For example, the flash control unit 30 performs the notification through display on the flash display unit 7 in B of FIG. 1. As a form of the notification process, an error screen may be simply displayed, or the number of receivers RV that are allocated to the group frames and the number of receivers RV that are necessary may be presented.

When the user checks the notification screen displayed on the flash display unit 7, the user can reset the number of receivers RV for each group frame and add the receiver RV.

After the notification process in step S210 is performed, the flash control unit 30 terminates the process of performing allocation to the group frames.

Here, the notification process is not a necessary process, and it may not be performed.

In addition, even after allocation of the receivers RV to the group frames is completed, it is possible to adjust a light emission amount for each receiver RV and a direction of the light emitting unit 3, and the like. In this case, according to an input operation by the user using the flash apparatus 1, the flash control unit 30 transmits such an instruction for each receiver RV, and thus automatically performs the adjustment. In addition, when the user operates the receiver RV, the adjustment can be performed manually.

7. Second Embodiment

A process of the commander CMD allocating receivers RV to group frames in the second embodiment will be described with reference to FIG. 8 to FIG. 12.

In the second embodiment, the group frames are set on the basis of information regarding light emission amount proportions of the receivers RV input by the user and the receivers RV are allocated to the set group frames. Accordingly, when the user inputs a light emission amount proportion for each group frame to the commander CMD, without the user setting the group frames by performing an input operation for each receiver RV to be installed, the receiver RV can be automatically allocated to the group frames such that the input light emission amount proportions are applied thereto.

A of FIG. 8 is an explanatory diagram showing setting of group frames performed by the user and B of FIG. 8 is an explanatory diagram showing a state in which allocation of the receivers RV to the group frames is completed.

In the present embodiment, as in the first embodiment, a commander CMD and five receivers RV are provided. The receivers RV are assigned with an identification ID of 001 to 005. The receiver 001 has a light emission amount of 10, the receiver 002 has a light emission amount 20, the receiver 003 has a light emission amount of 30, the receiver 004 has a light emission amount of 40, and the receiver 005 has a light emission amount of 50.

First, as in the first embodiment, the user causes the group frame setting screen 70 to be displayed on the flash display unit 7. By operating various buttons, the user sets a plurality of group frames and inputs a light emission amount proportion for each group frame. In the present embodiment, the user sets a group GP1 and a group GP2 and sets a light emission amount ratio between the group GP1 and the group GP2 to 1:3.

When setting by the user in the commander CMD is completed, the commander CMD automatically allocates the receivers RV to the group frames such that the set light emission amount proportions are applied thereto. When allocation to the group frames is completed, as shown in B of FIG. 8, the allocation result screen 71 of the receivers RV is displayed on the flash display unit 7 of the commander CMD. On the allocation result screen 71, for each group frame, IDs of the allocated receivers RV and a sum of light emission amounts of the allocated receivers RV are displayed.

After allocation to the group frames is completed, the user installs the receivers RV of the group GP1 and the group GP2, which are allocated to the group frames, at arbitrary positions. When the user operates the commander CMD, the disposed receivers RV can be caused to perform a light emission operation for each group. Accordingly, it is possible to image a subject at an arbitrary light emission amount proportion that the user desires.

A first example of a process of performing allocation to the group frames, which is performed by the flash control unit 30 as the commander CMD, in order to implement automatic allocation of the receivers RV to the group frames as described above will be described with reference to FIG. 9. Here, processes the same as in the first embodiment are denoted with the same reference numerals, and descriptions thereof will be omitted.

In a process of performing allocation to the group frames, the flash control unit 30 as the commander CMD performs a pairing process with the receivers RV as shown in step S101 in A of FIG. 7.

The flash control unit 30 performs a link-up process in step S201, and acquires light emission amount information from the receiver RV in step S301. The flash control unit 30 acquires light emission amount information for each piece of model information shown in FIG. 10 through wireless communication and manages them in association with receiver IDs. The flash control unit 30 acquires light emission amount information of the receiver RV through the communication unit 38.

Next, in step S302, the flash control unit 30 acquires information regarding the light emission amount proportion input by the user and sets the group frames according to the light emission amount proportion. In the present embodiment, on the basis of the light emission amount ratio of "1:3" input by the user, the flash control unit 30 sets the group GP1 with a proportion of "1" and the group GP2 with a proportion of "3."

In step S303, the flash control unit 30 calculates a sum of light emission amounts of all receivers RV from the acquired information regarding the light emission proportions of all receivers RV. In the example shown in A of FIG. 8, the flash control unit 30 calculates a sum value of the light emission amounts of the receivers 001 to 005. Here, a sum value of the light emission amounts is 150 (=10+20+30+40+50).

In step S304, the flash control unit 30 calculates a sum value of the light emission amount proportions of all group frames. In the present embodiment, a value of "4" which is a sum of a value "1" of the light emission amount proportion of the group GP1 and a value "3" of the light emission amount proportion of the group GP2 is calculated.

The processes of step S303 and step S304 are used when a necessary luminescence amount is calculated in step S305 to be described below.

In step S305, the flash control unit 30 calculates a necessary luminescence amount. The necessary luminescence amount is a value of the light emission amount to be allocated for each group frame.

The necessary luminescence amount is obtained by (sum of values of light emission amounts of all group frames/sum of values of light emission amount proportions of all group frames)×(value of light emission amount proportion of each group frame). Here, fractions are rounded off.

In the example shown in A of FIG. 8, according to the above calculation formula, the value of the necessary luminescence amount of the group GP1 is set to 40 and the value of the necessary luminescence amount of the group GP2 is set to 110.

According to the process in which the receivers RV are allocated, regarding the necessary luminescence amount, a value corresponding to the light emission amount of the allocated receiver RV is subtracted in step S306 to be described below. The necessary luminescence amount is set in each group frame, and the flash control unit 30 allocates the receiver RV on the basis of the necessary luminescence amount of each group frame.

Next, in step S306, the flash control unit 30 determines whether all receivers RV subjected to the link-up process have been allocated to respective group frames. When there is a receiver RV that has not yet been allocated to the group frames, the process of the flash control unit 30 advances to step S307.

In step S307, the flash control unit 30 selects a receiver RV with the maximum light emission amount among the unallocated receivers RV. Then, the flash control unit 30 selects a group frame with the maximum necessary luminescence amount in step S308, and allocates the receiver RV with the maximum light emission amount in step S309.

In the example shown in B of FIG. 8, for example, in allocation to the first group frame, the receiver 005 (light emission amount value of 50) with the largest light emission amount is selected, and is allocated to the group GP2 (necessary luminescence amount of 110) with the largest necessary luminescence amount.

In step S310, the flash control unit 30 updates the necessary luminescence amount of the group frame to which the receivers RV are allocated. The necessary luminescence amount is updated by subtracting a value of the light emission amount of the allocated receiver RV from the necessary luminescence amount of the group frame to which the receivers RV are allocated.

In the present embodiment, for example, the necessary luminescence amount of the group GP2 to which the receiver 005 (light emission amount value of 50) is allocated is updated from "110" to "60."

For example, the flash control unit 30 repeats the processes of steps S306 to S310 until all receivers RV are allocated to respective group frames.

When allocation of all receivers RV to the group frames is completed, the process of the flash control unit 30 advances to step S311, a value of a light emission amount proportion for each group frame after the receiver RV is allocated is compared with a value of a light emission amount proportion for each group frame input by the user, and it is determined whether a difference therebetween is within an allowable range. In order to determine whether a difference therebetween is within an allowable range, for example, a method may be conceived in which one of the light emission amount proportions for each group frame input by the user is set as a reference, and a difference from a light emission amount proportion of another group frame is used. In the example shown in A of FIG. 8, a range in which a light emission amount proportion of a group G2 is 2.5 times to 3.5 times a light emission amount proportion of a group G1 based on a light emission amount proportion of "1" of the group G1 can be the allowable range. In this case, a light emission amount ratio between the group G1 and the group G2 in a range of "1:2.5 to 1:3.5" can be the allowable range.

When it is determined that the difference between a value of a light emission amount proportion for each group frame after the receiver RV is allocated and a value of a light emission amount proportion for each group frame input by the user exceeds the allowable range, the flash control unit 30 performs a process of notifying of the fact in step S312. For example, the flash control unit 30 performs the notification through display on the flash display unit 7 in B of FIG. 8. As a form of the notification process, an error screen may be simply displayed or a sum value of light emission amounts for each group frame and a value of an insufficient light emission amount for each group frame may be presented.

When the user checks the notification screen displayed on the flash display unit 7, it is possible to reset a value of a light emission amount proportion for each group frame and add the receiver RV.

After the notification process in step S312 is performed, the flash control unit 30 terminates the process of performing allocation to the group frames.

In addition, in step S311, if a light emission amount proportion for each group frame after allocation is within the allowable range as compared with the input value of the light emission amount proportion, the flash control unit 30 terminates the process of performing allocation to the group frames.

Here, in the example shown in FIG. 9, when all receivers RV are allocated to respective group frames, the flash control unit 30 may perform a group off process for some receivers RV so that the light emission amount proportions are within the allowable range. In addition, after all receivers RV are allocated to respective group frames, group off processing can be performed on some of the allocated receivers RV so that the light emission amount proportions are within the allowable range.

A second example of a process of performing allocation to the group frames in the second embodiment will be described below with reference to FIG. 11. Here, processes the same as in the first example shown in FIG. 9 are denoted with the same reference numerals and descriptions thereof will be omitted.

In the second example, after the flash control unit 30 updates the necessary luminescence amount of the group frame to which the receivers RV are allocated in step S310, a process of determining whether it is necessary to reset the group frame is performed in step S313.

Cases in which it is necessary to reset the group frame include, for example, a case in which a new receiver RV is added during allocation to the group frame and a case in which the power of a receiver RV that was turned off is turned on.

In step S313, when the flash control unit 30 determines that it is necessary to reset the group frame due to addition of a new receiver RV and the like, all allocations of the receivers RV to the group frame first subjected to the link-up process are reset and the process advances to step S201. In step S201, the flash control unit 30 performs a link-up process for all receivers RV including the newly added receiver RV and performs the same processes as in first example thereafter.

In step S313, when a new receiver RV has not been added, the process of the flash control unit 30 advances to step S306, and the same processes as in first example thereafter are performed.

With a configuration as in the second example, even if a new receiver RV is added during the process of allocating the receivers RV to the group frames, it is possible to calculate a necessary luminescence amount for each group frame again for when the new receiver RV is added.

A third example of a process of performing allocation to the group frames in the second embodiment will be described below with reference to FIG. 12. Here, processes the same as in the first example shown in FIG. 9 and the second example shown in FIG. 11 are denoted with the same reference numerals, and descriptions thereof will be omitted.

In the third example, in step S313, when it is determined that it is necessary to reset the group frame due to addition of a new receiver RV, the process of the flash control unit 30 advances to step S314.

In step S314, the flash control unit 30 performs a link-up process for the added receiver RV, and acquires light emission amount information for the receiver RV through wireless communication.

In addition, in step S315, the flash control unit 30 recalculates the necessary luminescence amount when the new receiver RV is added. When the necessary luminescence amount is recalculated, the flash control unit 30 calculates again a sum of light emission amounts of all receivers RV from the acquired information regarding light emission amounts of all receivers RV, and calculates again a sum value of the light emission amount proportions of all group frames.

In step S316, the flash control unit 30 calculates a current necessary luminescence amount. The flash control unit 30 subtracts a value of the light emission amount of the receiver RV of which allocation is currently completed from the necessary luminescence amount for each group frame calculated in step S315.

Then, the process of the flash control unit 30 advances to step S307 and the same processes thereafter are performed.

With a configuration as in the third example, even if a new receiver RV is added during the process of performing allocation to the group frames, it is possible to advance the allocation process without wasting time on the process of allocating the receivers RV to previous group frames.

8. Third Embodiment

Allocation of the receivers RV to the group frames in the third embodiment will be described with reference to FIG. 13 to FIG. 17.

In the example shown in FIG. 13, a group frame is set on the basis of attribute information of a function of the receiver RV input by the user, and a receiver RV having the function is allocated to the set group frame. Accordingly, when the user inputs attribute information of the function for each group frame to the commander CMD, without the user setting the group frames by performing an input operation for each receivers RV to be installed, the receiver RV can be automatically allocated to the group frames according to a purpose of the receiver RV.

A of FIG. 13 is an explanatory diagram showing setting of group frames performed by the user and B of FIG. 13 is an explanatory diagram showing a state in which allocation of the receivers RV to the group frames is completed.

In the third embodiment, as in the first embodiment, a commander CMD and five receivers RV with an identification ID are provided. The five receivers RV have different performances and have various functions.

First, as in the first embodiment, the user causes the group frame setting screen 70 to be displayed on the flash display unit 7. By operating various buttons, the user sets a plurality of group frames and inputs a purpose for each group frame. In the example shown in A of FIG. 13, the user sets three group frames of a group GP1 to a group GP3 on the group frame setting screen 70 and sets "main light" for the group GP1, "auxiliary light" for the group GP2, and "with wide panel" for the group GP3 as purposes.

Here, the purpose designated for each group is not limited to one, and two or more purposes can be set. For example, "main light and with wide panel" can be set for the group GP1 as purposes.

When setting by the user in the commander CMD is completed, the commander CMD performs automatic allocation to the group frames according to the performance of the receiver RV. When allocation to the group frames is completed, as shown in B of FIG. 13, the allocation result screen 71 of the receivers RV is displayed on the flash display unit 7 of the commander CMD. IDs of the allocated receivers RV for each group frame are displayed on the allocation result screen 71.

After allocation to the group frames is completed, the user installs receivers RV for each group, which are allocated to the group frames. When the user operates the commander CMD, the disposed receivers RV can be operated for each group.

A first example of a process of performing allocation to the group frames that is performed by the flash control unit 30 as the commander CMD in order to implement automatic allocation of the receivers RV to the group frames as described above will be described with reference to FIG. 14 and FIG. 15. Here, processes the same as in the first embodiment in FIG. 9 are denoted with the same reference numerals, and descriptions thereof will be omitted. In addition, in the process of performing allocation to the group frames described below, the pairing process in step S101 in A of FIG. 7 is assumed to be performed.

The flash control unit 30 performs a link-up process in step S201 in FIG. 14 and acquires attribute information from the receiver RV in step S401. When the flash control unit 30 acquires attribute information for each receiver RV through wireless communication, attributes for each receiver RV as shown in FIG. 15 can be ascertained.

In the attribute information, a main light function, an auxiliary light function, a wide panel function, and a remote lens function, and type information for various receivers RV shown in FIG. 15 are included. Here, in FIG. 15, o indicates a function that each device has.

In step S402, the flash control unit 30 acquires information regarding the function of the receiver RV input by the user and sets the group frames for each function. In A of FIG. 13, as an example, the main light function is set for the group GP1, the auxiliary light function is set for the group GP2, and the wide panel function is set for the group GP3.

The flash control unit 30 performs a first receiver allocating process in step S403. In the first receiver allocating process, when the receiver RV has attributes of an unallocated group frame and there is one unallocated receiver RV in a group frame, the unallocated receiver RV is preferentially allocated to the group frames.

This is because, when there is only one receiver RV having attributes of a certain group frame, if the receiver RV is allocated to another group frame, it is not possible to appropriately allocate the receivers RV to all group frames.

In the example shown in FIG. 15, there is only one receiver RV having a "main light" function that is ID 003. Therefore, ID 003 is preferentially allocated to the group GP1 on the basis of the "main light" function so that it is not allocated to the group GP3 on the basis of the "wide panel" function.

In step S404, the flash control unit 30 determines whether all receivers RV subjected to the link-up process have been allocated to respective group frames.

When there is a receiver RV that has not yet been allocated to the group frames, the process of the flash control unit 30 advances to step S405, and it is determined whether allocation of the receivers RV to the group frames has been newly updated. When allocation of the receivers RV to the group frames has been newly updated, the process of the flash control unit 30 returns to step S403 and the same processes are repeated. Accordingly, allocation of the receiver RV that satisfies conditions to a group frame including only one receiver RV that satisfies the conditions is completed.

In step S405, when allocation of the receivers RV to the group frames has not been newly updated, allocation of only one receiver RV that satisfies conditions to the group frame is assumed to be completed. Then, the process of the flash control unit 30 advances to step S406, and it is determined whether the receiver RV is a receiver RV having attributes necessary for an unallocated group frame.

In step S406, when it is determined that the receiver RV is a receiver RV having attributes necessary for the unallocated group frame, the flash control unit 30 performs a second receiver allocating process in step S407.

In the second receiver allocating process, the flash control unit 30 allocates a receiver RV having attributes necessary for an unallocated group frame.

When the second receiver allocating process is completed, the process of the flash control unit 30 returns to step S403 and the same processes are repeated. Accordingly, at least one receiver RV is allocated to all group frames.

In step S406, when it is determined that the receiver RV is not for the unallocated group frame, the flash control unit 30 determines whether there is a receiver RV having attributes necessary for any group frame in step S408.

When there is a receiver RV having attributes necessary for any group frame, the process of the flash control unit 30 advances to step S409 and a third receiver allocating process is performed. In the third receiver allocating process, the receiver RV is allocated to the group frames set according to the attributes.

Then, the process of the flash control unit 30 advances to step S404, and the same processes are performed until all receivers RV that satisfy conditions of the group frames are allocated to the group frames. Accordingly, all receivers RV to be allocated to the set group frames are allocated to the group frames.

When all receivers RV that satisfy conditions of the group frames are allocated to the group frames, the process of the flash control unit 30 advances from step S408 to step S410, and the same group off process as in step S209 in FIG. 9 is performed on the remaining receivers RV.

In the example shown in B of FIG. 13, the remaining receiver RV with ID 005 after allocation to the group frames is completed is displayed as a group off on the allocation result screen 71.

In step S405, when it is determined that there is no unallocated receiver RV, the process of the flash control unit 30 advances to step S411.

In step S411, the flash control unit 30 determines whether there is a group frame for which allocation of the receivers RV has not been completed.

When allocation of the receivers RV to the group frames is completed, the flash control unit 30 terminates the process of performing allocation to the group frames. Accordingly, for example, as shown in B of FIG. 13, allocation to the group frames is completed.

When there is a group frame for which allocation of the receivers RV has not been completed, the flash control unit 30 performs a process of notifying of the fact in step S412. For example, the flash control unit 30 performs the notification through display on the flash display unit 7 in B of FIG. 13. As a form of the notification process, various forms as in the first embodiment may be conceived.

When the user checks the notification screen displayed on the flash display unit 7, the user can reset the number of receivers RV for each group frame and add the receiver RV.

After the notification process in step S412 is performed, the flash control unit 30 terminates the process of performing allocation to the group frames.

A second example of a process of performing allocation to the group frames in the third embodiment will be described below with reference to FIG. 16. Processes the same as in the first example shown in FIG. 14 are denoted with the same reference numerals, and descriptions thereof will be omitted.

In the second example, after step S403, the flash control unit 30 performs a process of determining whether it is necessary to reset the group frame in step S413. A case in which it is necessary to reset the group frame is a case in which a new receiver RV is added during allocation to the group frame.

In step S413, when it is determined that it is necessary to reset the group frame due to addition of a new receiver RV, the flash control unit 30 resets all allocations of the receivers RV to the group frames subjected to the link-up process first and the process advances to step S201. In step S201, the flash control unit 30 performs a link-up process for all receivers RV including the newly added receiver RV and performs the same processes as in first example thereafter.

In step S414, when a new receiver RV has not been added, the process of the flash control unit 30 advances to step S405 and the same processes as in first example thereafter are performed.

With a configuration as in the second example, even if a new receiver RV is added during the process of allocating the receivers RV to the group frames, it is possible to calculate a necessary luminescence amount for each group frame again for when the new receiver RV is added.

A third example of a process of performing allocation to the group frames in the third embodiment will be described below with reference to FIG. 17. Here, processes the same as in the first example shown in FIG. 14 and the second example shown in FIG. 16 are denoted with the same reference numerals, and descriptions thereof will be omitted.

In the present example, in step S413, when it is determined that it is necessary to reset the group frame due to addition of a new receiver RV, the process of the flash control unit 30 advances to step S414.

In step S414, the flash control unit 30 performs a link-up process for the added receiver RV and acquires attribute information for the receiver RV through wireless communication.

Then, the process of the flash control unit 30 advances to step S404 and the same processes as in the first example and the second example thereafter are performed.

With a configuration as in the third example, even if a new receiver RV is added during the process of performing allocation to the group frames, it is possible to advance the allocation process without wasting time on the process of allocating the receivers RV to previous group frames.

9. Fourth Embodiment

As the fourth embodiment, a process of allocating receivers RV to group frames in the fourth embodiment will be described with reference to FIG. 18 and FIG. 19.

In the fourth embodiment, the user installs receivers RV at various places in advance and receivers RV positioned in a certain area are set as one group. The group setting is automatically performed by an operation on the side of the commander CMD. Therefore, the user can group receivers RV disposed in a certain area without taking the time to go to the area and operating them.

In the example shown in A of FIG. 18, as in the first embodiment, a commander CMD and five receivers RV with an identification ID are provided. As shown in A of FIG. 18, the user operates the commander CMD when five receivers RV are installed, and inputs, for example, a condition that receivers RV positioned within a distance of 1 m from each other are set as a group frame.

When setting of group frames according to the operation input by the user to the commander CMD is completed, as shown in B of FIG. 18, the commander CMD automatically sets receivers RV whose distances from each other are within 1 m as a group. Here, when there is no other receiver RV within 1 m around a subject receiver RV, the commander CMD sets the subject receiver RV as a group of one.

A process of performing allocation to the group frames performed by the flash control unit 30 as the commander CMD in order to implement a process of automatically allocating the receivers RV to the group frames as described above will be described with reference to FIG. 19. Here, processes the same as in the first embodiment are denoted with the same reference numerals, and descriptions thereof will be omitted.

The flash control unit 30 performs a link-up process in step S201 and acquires position information from the receiver RV in step S501. For example, the flash control unit 30 of the receiver RV acquires the position information from a GPS through the communication unit 38 and transmits the position information to the commander CMD through the communication unit 38.

Next, the flash control unit 30 acquires set distance information which is information regarding a set distance input by the user in step S502, and the set distance information indicates a distance between receivers RV that form a group. In A of FIG. 18, as an example, a distance between receivers RV as a group frame is set to 1 m.

In step S503, the flash control unit 30 determines whether all receivers RV subjected to the link-up process have been allocated to respective group frames.

When there is a receiver RV that has not yet been allocated to the group frames, the process of the flash control unit 30 advances to step S504.

The flash control unit 30 selects a receiver RV that is not grouped in step S504 and sets a group frame including the selected receiver RV in step S505.

In step S506, when there is another receiver RV within a set distance range from the receiver RV allocated to the group frames, the flash control unit 30 adds the other receiver RV to the group frame in step S507.

In the example shown in B of FIG. 18, first, a group frame including a receiver RV001 is set, and receivers RV002 and RV003 that are positioned within 1 m from the receiver RV001 are allocated to the group frames including the receiver RV001. The flash control unit 30 repeats the processes of steps S506 and S507 and allocates receivers RV within the set distance range to the group frame, and when the allocation is completed, the process advances from step S506 to step S503.

The flash control unit 30 repeats the processes of steps S503 to S507 until all receivers RV are allocated to respective group frames.

When allocation of all receivers RV to the group frames is completed, the flash control unit 30 terminates the process of performing allocation to the group frames.

10. Summary and Modified Examples

In the above embodiments, the following effects are obtained.

A communication device of an embodiment includes the communication unit 38 configured to perform communication with a plurality of receivers RV (external communication devices), and the allocation unit 30b configured to allocate the plurality of receivers RV (external communication device) to one or a plurality of group frames on the basis of information regarding the plurality of receivers RV (external communication devices) obtained through the communication unit 38.

In addition, the setting unit 30a configured to set an allocation type of one or a plurality of group frames serving as allocation destinations of the receivers RV (external communication devices) is further included.

In addition, the setting unit 30a sets an allocation type of the one or a plurality of group frames on the basis of information regarding the receiver RV (external communication device) obtained through the communication unit 38.

In this manner, the communication device can automatically allocate the receivers RV to the group frames according to settings on the side of the commander CMD without setting the group frame for each receiver RV. The commander CMD can perform wireless communication for each group with respect to the receivers RV allocated to the group frames.

Therefore, when the user performs communication using a plurality of communication devices, an operation of setting the group frame of the receiver RV is simplified. For example, when there are ten receivers RV, it is necessary for the user to perform an operation when the ten receivers RV are allocated to respective group frames. However, when the user simply operates the commander CMD, it is possible to set the group frames for ten receivers RV. In this manner, since it is not necessary to set the group frame for each receiver RV, it is possible to significantly reduce an operation time necessary for the user to set the receiver RV to the group frame. Therefore, it is possible to improve operability for the user, improve convenience, and improve work efficiency.

In addition, the setting unit 30a sets an allocation type of one or a plurality of group frames on the basis of information input by the user (for example, A of FIG. 6).

The user can directly input information for allocating the group frame by operating the commander CMD when the receiver RV is allocated to the group frames. Therefore, when the user directly inputs conditions for setting the group frame to the flash apparatus 1 as the commander CMD, it is possible to allocate the receiver RV to the group frame in which conditions that he or she desires are reflected.

In addition, the allocation unit 30b allocates the receiver RV (external communication device) to the group frame using information regarding the number of receivers RV (external communication devices) connected to the communication unit 38 (FIG. 7).

Accordingly, allocation to the group frame according to information regarding the number of receivers RV can be automatically performed.

Therefore, since it is not necessary for the user to set the group frame for each of the plurality of receivers RV (the flash apparatuses 1), it is possible to reduce a time of an input operation by the user, and improve convenience. In addition, if there are many receivers RV, the user does not know which receiver RV is allocated to which group frame in many cases. However, in the embodiment of the present technology, since the number of receivers RV for each group frame can be set in advance in the commander CMD, it is possible to prevent the user from making a mistake in setting the number of receivers RV for each group.

In addition, the allocation unit 30b allocates the receiver RV (external communication device) to the group frame using light emission amount information of the receiver RV (external communication device) obtained through the communication unit 38.

Accordingly, the receiver RV can be automatically allocated to the group frames according to the light emission amount information that the receiver RV has. Therefore, it is possible to reduce time and effort taken when, after the user installs the receivers RV, the receivers RV are caused to emit light experimentally again, and allocation of the number of receivers RV for each group frame is adjusted and changed after the light emission amount is checked. That is, the user can simply allocate the receivers RV to respective group frames by inputting a desired light emission amount for each group frame to the flash apparatus 1 as the commander CMD and it is possible to further improve convenience for the user.

In addition, the setting unit 30a sets a light emission amount proportion of each group frame on the basis of information regarding the light emission amount proportion input by the user, and the allocation unit 30b allocates the receiver RV (external communication device) to the group frame using the light emission amount proportion of each group frame and light emission amount information of the receiver RV (external communication device) obtained through the communication unit 38 (FIG. 12).

Accordingly, the group frames for allocating the receivers RV are set on the basis of information regarding the light emission amount proportion input by the user and the receivers RV are automatically allocated to the group frames so that the input light emission amount proportions are approached.

Therefore, by simply setting the group frames in the flash apparatus 1 as the commander CMD, the receiver RV can be automatically allocated so that a light emission amount proportion that the user desires is obtained. Since it is possible to reduce time and effort taken when the user actually disposes the receiver RV and allocation to the group frames is adjusted and changed while causing the receiver RV to emit light, it is possible to improve convenience for the user.

In addition, the allocation unit 30b allocates the plurality of receivers RV (external communication devices) in descending order of the light emission amount to the group frames (step S307 in FIG. 12).

The receivers RV are allocated to the group frames in descending order of an influence on the light emission amount proportion of each group frame.

Accordingly, when the receivers RV are allocated to the group frames, it is possible to reduce a difference between the light emission amount proportion for each group frame and the set light emission amount proportion for each group frame input by the user.

In addition, the communication device further includes the notification unit 30c configured to perform a process of notifying the user according to a result obtained by comparing the set light emission amount proportion of each group frame with the light emission amount proportion of the allocated receiver RV (external communication device) of each group frame (step S312 in FIG. 12).

When the receiver RV is allocated to each group frame, a difference between the light emission amount proportion of the allocated receiver RV of each group frame and the set light emission amount proportion of each group frame may exceed an allowable range. In such a case, a process of notifying the user of the fact is performed.

Therefore, the user can easily check whether it is necessary to add a receiver RV and whether it is necessary to change setting conditions for the group frame according to the notification.

In addition, the allocation unit 30b allocates the receiver RV (external communication device) to the group frame using attribute information of the receiver RV (external communication device) obtained through the communication unit 38 so that a plurality of receivers RV (external communication devices) allocated to the group frames have the same attributes (FIG. 15).

Accordingly, the receiver RV having attributes necessary for the purpose of the group frames is automatically allocated to the group frames.

Therefore, since the receiver RV is automatically allocated to each group frame according to an imaging purpose of the user, it is not necessary to perform a group frame setting operation for each receiver RV while the user checks attribute information for each receiver RV. Accordingly, it is possible to significantly reduce a time for an input operation by the user and it is possible to improve convenience. In addition, even if the user does not know attribute information of each receiver RV, the receiver RV is appropriately allocated to the group frames according to the purpose of the user. That is, it is possible to easily find the receiver RV according to the purpose of the user.

In addition, the setting unit 30a sets attributes of each group frame on the basis of information input by the user, and the communication device includes the notification unit 30c configured to perform a process of notifying the user that, as a result of allocation by the allocation unit 30b, there is a group frame to which receivers RV (external communication devices) with the set attributes have not been allocated (step S413 in FIG. 15).

When attributes of each group frame are set on the basis of information input by the user, and the receiver RV with attributes set for each group frame is allocated, there is no receiver RV that can be allocated to the group frames. In this case, the user is notified of the fact.

Therefore, the user can easily check whether it is necessary to add a receiver RV and whether it is necessary to change setting conditions for the group frame according to the notification.

In addition, the allocation unit 30b allocates the receiver RV (external communication device) to the group frame using type information of the receiver RV (external communication device) obtained through the communication unit 38 so that a plurality of receivers RV (external communication device) allocated to the group frames have the same attributes.

Accordingly, even if the user does not know attribute information of the receiver RV, the receiver RV can be appropriately allocated to the group frames according to the purpose of the user. In addition, when type information of the receiver RV is used, it is possible to allocate the receiver RV to the group frame necessary for the purpose of the user more accurately.

In addition, the allocation unit 30b allocates the receiver RV (external communication device) to the group frame using position information of the receiver RV (external communication device) obtained through the communication unit 38 (FIG. 19).

Accordingly, allocation of the receiver RV to the groups is automatically performed according to position information.

Therefore, the user can flexibly set the group frame while checking a state in which the receivers RV are disposed. That is, it is possible to reduce time and effort taken when it is necessary to correct settings of the group frame when the receivers RV are actually installed after the receivers RV are allocated to each group frame.

In addition, since the commander CMD sets the group frames and allocates the receiver RV to the group frames, it is not necessary for the user to take the time to go to a disposition place when the receiver RV is disposed, and thus it is possible to further improve convenience for the user.

In addition, while or after the receiver RV (external communication device) is allocated to the group frames, when a new receiver RV (external communication device) is added, the allocation unit 30b allocates the added receiver RV (external communication device) to the group frame using information regarding the added receiver RV (external communication device) (step S314 in FIG. 11).

Accordingly, the added receiver RV is also automatically allocated to the group frames.

Therefore, the user can also flexibly add a receiver RV that was not initially scheduled to be allocated to the group frames and it is possible to further improve convenience for the user.

In addition, the receiver RV is the flash apparatus 1 (light emitting device).

That is, the flash apparatus 1 as the receiver RV is automatically allocated to the group frames according to the acquired information.

Flash apparatuses 1 as the receivers RV are disposed at various positions according to how the subject is imaged when imaging is performed by the camera device 10, and there are many chances to change the number of flash apparatuses and a model in order to adjust the light emission amount. Therefore, allocation to the group frame according to information regarding the number of flash apparatuses 1, light emission amount information, and position information is particularly useful in the light emitting device such as the flash apparatus 1.

Here, the configuration and processing example of the flash apparatus 1 in the embodiment are an example. Various configuration examples and processing examples other than those described above are assumed.

In the embodiment of the present technology, while the commander CMD has been described as the flash apparatus 1, the camera device 10 may be the commander CMD. In this case, the camera control unit 50 of the camera device 10 includes an acquisition unit 30*a*, the setting unit 30*a*, the allocation unit 30*b*, and the notification unit 30*c*, which are not shown.

As in the flash apparatus 1, the communication unit 60 is provided in the camera device 10. The acquisition unit 30*a* acquires information regarding the receiver RV. The setting unit 30*a* of the camera device 10 sets the group frames on the basis of information input by the user through the operation input unit 57. The allocation unit 30*b* allocates the receiver RV to the group frame using information regarding the receiver RV that is acquired by the acquisition unit 30*a*.

The program of the embodiment of the present technology is a program causing a communication device to execute a function of acquiring information regarding external communication devices which are all or some of other communication devices to be connected through wireless communication, a function of setting one or a plurality of group frames serving as allocation destinations of the external communication devices, and a function of allocating the external communication devices to the set group frames on the basis of the information.

More specifically, the program is a program causing the flash control unit 30 as an arithmetic processing unit to execute any of the processes shown in FIG. 7, FIG. 9, FIG. 11, FIG. 12, FIG. 14, FIG. 16, FIG. 17, and FIG. 19.

According to such a program, the flash apparatus 1 of the present embodiment is easily realized.

Then, such a program can be stored in a recording medium built into a device such as an arithmetic processing unit or a ROM in a microcomputer having a CPU in advance. Alternatively, the program can be stored temporarily or permanently in a removable recording medium such as a semiconductor memory, a memory card, an optical disc, a magneto optical disc, and a magnetic disk. In addition, such a removable recording medium can be provided as so-called package software.

In addition, such a program can be installed in a personal computer from a removable recording medium, and can be downloaded from a download site via a network such as a LAN or the Internet.

Here, the flash apparatus 1 has been exemplified for the commander CMD or the receiver RV in this specification. However, the present technology can be applied in various forms as long as it is a communication device capable of performing wireless communication from the commander CMD to a plurality of receivers RV.

In addition, the effects described in this specification are only examples. The present technology is not limited thereto and other effects may be provided.

Here, a process of the receiver RV in the wireless flash system in the present embodiment is described. The receiver RV in the present embodiment is the flash apparatus 1 and has the same configuration as the commander CMD.

First, when a pairing request from the commander CMD is received in step S101 in A of FIG. 7, the flash control unit 30 of the receiver RV performs a process of transmitting information necessary for pairing such as the communication ID through the communication unit 38. The information transmitted from the receiver RV is stored in the memory unit 31 of the commander CMD and the like. Accordingly, the pairing process between the commander CMD and the receiver RV is completed.

The flash control unit 30 of the receiver RV can communicate with the commander CMD according to the link-up process from the commander CMD in step S202 in B of FIG. 7.

Then, the flash control unit 30 of the receiver RV transmits information regarding the receiver RV to the commander CMD through the communication unit 38 in response to the request from the commander CMD.

The commander CMD performs a process of setting an allocation type of the group frame and a process of allocating the receivers RV to the group frames on the basis of the information regarding the receiver RV received from the receiver RV.

Then, when operation information from the commander CMD is received through the communication unit 38, the flash control unit 30 of the receiver RV performs a process of causing the receiver RV to perform an operation according to the operation information. For example, according to the operation from the commander CMD, flash light is emitted to the flash apparatus 1 as the receiver RV. In this manner, the receiver RV can perform various operations according to an instruction from the commander CMD.

The communication device (receiver RV) of the embodiment includes the communication unit 38 and a control unit (the flash control unit 30) causing the commander CMD (host device) to transmit self information used for a process of performing allocation to the group frames in the commander CMD (host device) through the communication unit 38.

Accordingly, without the user setting the group frames by performing an input operation for each receiver RV, it is possible to automatically allocate the receiver RV to the group frame according to settings on the side of the commander CMD.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A communication device including:

a communication unit configured to perform communication with a plurality of external communication devices; and an allocation unit configured to allocate the plurality of external communication devices to one or a plurality of group frames on a basis of information regarding the plurality of external communication devices obtained through the communication unit.

(2)

The communication device according to (1), further including a setting unit configured to set an allocation type of one or the plurality of group frames serving as allocation destinations of the external communication devices.

(3)

The communication device according to (2), in which the setting unit sets an allocation type of the one or the plurality of group frames on the basis of information regarding the external communication devices obtained through the communication unit.

(4)

The communication device according to (2) or (3), in which the setting unit sets an allocation type of the one or the plurality of group frames on a basis of information input by a user.

(5)

The communication device according to (3) or (4), in which the allocation unit allocates the external communication devices to group frames by using information regarding the number of external communication devices connected to the communication unit.

(6)

The communication device according to any of (3) to (5), in which the allocation unit allocates the external communication devices to group frames by using light emission amount information of the external communication devices obtained through the communication unit.

(7)

The communication device according to (6), in which the setting unit sets a light emission amount proportion of each group frame on the basis of information regarding the light emission amount proportion input by a user, and the allocation unit allocates the external communication devices to group frames by using the light emission amount proportion of each group frame and the light emission amount information of the external communication devices obtained through the communication unit.

(8)

The communication device according to (6) or (7), in which the allocation unit allocates the plurality of external communication devices to group frames in descending order of light emission amount.

(9)

The communication device according to (7) or (8), including a notification unit configured to perform a process of notifying the user in accordance with a result obtained by comparing the set light emission amount proportion of each group frame with the light emission amount proportion of the external communication device allocated to each group frame.

(10)

The communication device according to any of (2) to (9), in which the allocation unit allocates the external communication devices to group frames by using attribute information of the external communication devices obtained through the communication unit, such that the plurality of external communication devices allocated to a group frame have same attributes.

(11)

The communication device according to any of (3) to (10), in which the setting unit sets an attribute of each group frame on a basis of information input by a user, and the communication device includes a notification unit configured to perform a process of notifying the user that, as a result of allocation performed by the allocation unit, there is a group frame to which the external communication device with the set attribute has not been allocated.

(12)

The communication device according to (10) or (11), in which the allocation unit allocates the external communication devices to group frames by using type information of the external communication devices obtained through the communication unit such that the plurality of external communication devices allocated to group frames have same attributes.

(13)

The communication device according to any of (3) or (12), in which the allocation unit allocates the external communication devices to group frames using position information of the external communication devices obtained through the communication unit.

(14)

The communication device according to any of (3) to (13), in which, in a case where a new external communication device is added while or after the external communication devices are allocated to group frames, the allocation unit allocates the added external communication device to a group frame by using information regarding the added external communication device.

(15)

The communication device according to any of (1) to (14), in which the external communication device is a light emitting device.

(16)

A method of controlling a communication device including:

performing communication with a plurality of external communication devices; and allocating the plurality of external communication devices to one or a plurality of group frames on a basis of information regarding the plurality of external communication devices obtained through the communication.

(17)

A communication system including:

a communication device; and a plurality of external communication devices to be connected to the communication device through communication, in which the communication device performs communication with the plurality of external communication devices, and allocates the plurality of external communication devices to one or a plurality of group frames on a basis of information regarding the plurality of external communication devices obtained through the communication.

(18)

A communication device including:

a communication unit; and a control unit configured to cause a host device to transmit self information to be used in a process of performing allocation to group frames in the host device through the communication unit.

(19)

A communication device comprising:

communication circuitry configured to communicate with a plurality of external communication devices; and allocation circuitry configured to respectively allocate each of the plurality of external communication devices to at least one of a plurality of groups on a basis of information regarding the plurality of external communication devices received through the communication circuitry.

(20)
The communication device according to (19), further comprising:
setting circuitry configured to set an allocation type for at least one of the plurality of groups.

(21)
The communication device according to (20),
wherein the setting circuitry sets the allocation type on the basis of the information regarding the external communication devices received through the communication circuitry.

(22)
The communication device according to (20),
wherein the setting circuitry sets the allocation type on a basis of information input by a user.

(23)
The communication device according to (21),
wherein the information that the allocation circuitry uses as the basis for allocating the external communication devices to respective groups includes the number of external communication devices connected to the communication device through the communication circuitry.

(24)
The communication device according to (22),
wherein the information that the allocation circuitry uses as the basis for allocating the external communication devices to respective groups includes light emission amount information of the external communication devices received through the communication circuitry.

(25)
The communication device according to (24),
wherein the setting circuitry sets a light emission amount proportion of each of the groups on the basis of information regarding the light emission amount proportion input by a user, and
the allocation circuitry allocates the external communication devices to the respective groups by using the light emission amount proportion of each group and the light emission amount information of the external communication devices received through the communication circuitry.

(26)
The communication device according to (24),
wherein the allocation circuitry allocates the plurality of external communication devices to the respective groups according to a descending order of light emission amount.

(27)
The communication device according to (25), further comprising:
notification circuitry configured to notify the user in accordance with a result obtained by comparing the set light emission amount proportion of each group with respective light emission amount proportions of the external communication devices allocated to each group.

(28)
The communication device according to (21),
wherein the information that the allocation circuitry uses as the basis for allocating the external communication devices to respective groups includes attribute information of the external communication devices, such that those of the plurality of external communication devices allocated to a corresponding group have at least one same attribute.

(29)
The communication device according to (28), wherein the setting circuitry sets an attribute of each of the groups on a basis of information input by a user, and
the communication circuitry comprises notification circuitry configured to notify the user that there is a group to which at least one of the external communication devices with the set attribute has not been allocated.

(30)
The communication device according to (28),
wherein the information that the allocation circuitry uses as the basis for allocating the external communication devices to respective groups includes type information of the external communication devices, such that those of the plurality of external communication devices allocated to a corresponding group have a same type.

(31)
The communication device according to (21),
wherein the information that the allocation circuitry uses as the basis for allocating the external communication devices to groups includes position information of the external communication devices obtained through the communication circuitry.

(32)
The communication device according to (21),
wherein, in a case where a new external communication device is added while or after existing external communication devices are allocated to groups, the allocation circuitry allocates the new external communication device to a group using information regarding the new external communication device.

(33)
The communication device according to (19),
wherein the external communication device is a light emitting device.

(34)
A method of controlling a communication device comprising:
communicating with the external communication devices; and
allocating each of the external communication devices respectively to at least one of a plurality of groups on a basis of information regarding the external communication devices received through the communication circuitry.

(35)
A communication system comprising:
a communication device; and
a plurality of external communication devices to be connected to the communication device through communication,
wherein the communication device communicates with the external communication devices through communication circuitry; and
allocates each of the external communication devices respectively to at least one of a plurality of groups on a basis of information regarding the external communication devices received through the communication circuitry.

(36)
A communication device comprising:
communication circuitry for transmitting information to a host device; and
a controller configured to prompt the host device to perform allocation of the communication device to at least one of a plurality of groups on a basis of the information transmitted to the host device through the communication circuitry.

REFERENCE SIGNS LIST

1 flash apparatus
10 camera device 30 flash control unit
30a setting unit
30b allocation unit
32 light emission section
33 light emission control circuit
38 communication unit

The invention claimed is:

1. A communication device comprising:
communication circuitry configured to communicate information with a plurality of flash apparatuses, the information regarding the plurality of flash apparatuses;
allocation circuitry configured to respectively allocate each of the plurality of flash apparatuses to at least one of one or more groups on a basis of the information that is communicated; and
setting circuitry configured to set an allocation type for at least one of the one or more groups.

2. The communication device according to claim 1,
wherein the setting circuitry sets the allocation type on the basis of the information regarding the plurality of flash apparatuses received through the communication circuitry.

3. The communication device according to claim 2,
wherein the information that the allocation circuitry uses as the basis for allocating the plurality of flash apparatuses to respective groups includes a number of the plurality of flash apparatuses connected to the communication device through the communication circuitry.

4. The communication device according to claim 2,
wherein the information that the allocation circuitry uses as the basis for allocating the plurality of flash apparatuses to respective groups includes light emission amount information of the plurality of flash apparatuses received through the communication circuitry.

5. The communication device according to claim 4,
wherein the setting circuitry sets a light emission amount proportion of each of the groups on the basis of the information regarding the light emission amount proportion that is input by a user, and
the allocation circuitry allocates the plurality of flash apparatuses to the respective groups by using the light emission amount proportion of each group and the light emission amount information of the plurality of flash apparatuses received through the communication circuitry.

6. The communication device according to claim 4,
wherein the allocation circuitry allocates the plurality of flash apparatuses to the respective groups according to a descending order of light emission amount.

7. The communication device according to claim 5, further comprising:
notification circuitry configured to notify the user in accordance with a result obtained by comparing the set light emission amount proportion of each group with respective light emission amount proportions of the plurality of flash apparatuses allocated to each group.

8. The communication device according to claim 2,
wherein the information that the allocation circuitry uses as the basis for allocating the plurality of flash apparatuses to respective groups includes attribute information of the plurality of flash apparatuses, such that those of the plurality of flash apparatuses allocated to a corresponding group have at least one same attribute.

9. The communication device according to claim 8,
wherein the setting circuitry sets an attribute of each of the groups on a basis of information that is input by a user, and
the communication circuitry comprises notification circuitry configured to notify the user that there is a group to which at least one of the plurality of flash apparatuses with the set attribute has not been allocated.

10. The communication device according to claim 8,
wherein the information that the allocation circuitry uses as the basis for allocating the to respective groups includes type information of the plurality of flash apparatuses, such that those of the plurality of flash apparatuses allocated to a corresponding group have a same type.

11. The communication device according to claim 2,
wherein the information that the allocation circuitry uses as the basis for allocating the plurality of flash apparatuses to groups includes position information of the plurality of flash apparatuses obtained through the communication circuitry.

12. The communication device according to claim 2,
wherein, in a case where a new flash apparatus is added while or after existing flash apparatuses are allocated to groups, the allocation circuitry allocates the new flash apparatus to a group using information regarding the new flash apparatus.

13. The communication device according to claim 1,
wherein the setting circuitry sets the allocation type on a basis of information that is input by a user.

14. The communication device according to claim 1,
wherein each of the plurality of flash apparatuses includes a light emitting device.

15. The communication device according to claim 1,
wherein the one or more groups is two or more groups.

16. A method of controlling a communication device, the method comprising:
communicating information with a plurality of flash apparatuses, the information regarding the plurality of flash apparatuses;
allocating each of the plurality of flash apparatuses respectively to at least one of one or more groups on a basis of the information; and
setting an allocation type for at least one of the one or more groups.

17. A communication system comprising:
a communication device including communication circuitry, allocation circuitry, and setting circuitry; and
plurality of flash apparatuses to be connected to the communication device through communication,
wherein the communication circuitry is configured to communicate information with the plurality of flash apparatuses, the information regarding the plurality of flash apparatuses,
the allocation circuitry is configured to allocate each of the plurality of flash apparatuses respectively to at least one of one or more groups on a basis of the information, and
the setting circuitry is configured to set an allocation type for the at least one of the one or more groups.

18. A flash apparatus comprising:
communication circuitry for transmitting information to a host device, the information regarding the flash apparatus; and
a controller configured to prompt the host device to perform allocation of the flash apparatus to at least one of one or more groups and set an allocation type for the at least one of the one or more groups on a basis of the information transmitted to the host device through the communication circuitry.

* * * * *